(12) United States Patent
Bobak et al.

(10) Patent No.: US 7,958,393 B2
(45) Date of Patent: Jun. 7, 2011

(54) CONDITIONAL ACTIONS BASED ON RUNTIME CONDITIONS OF A COMPUTER SYSTEM ENVIRONMENT

(75) Inventors: Mythili K. Bobak, Lagrangeville, NY (US); Tim A. McConnell, Lexington, KY (US); Michael D. Swanson, Springfield, OR (US)

(73) Assignee: International Business Machines Corporation, Armonk, NY (US)

( * ) Notice: Subject to any disclaimer, the term of this patent is extended or adjusted under 35 U.S.C. 154(b) by 360 days.

(21) Appl. No.: 11/965,897

(22) Filed: Dec. 28, 2007

(65) Prior Publication Data

US 2009/0172461 A1 Jul. 2, 2009

(51) Int. Cl.
*G06F 11/00* (2006.01)

(52) U.S. Cl. ............................................. 714/15; 714/4

(58) Field of Classification Search ...................... 714/15
See application file for complete search history.

(56) References Cited

U.S. PATENT DOCUMENTS

| | | | | |
|---|---|---|---|---|
| 5,023,873 | A | | 6/1991 | Stevenson et al. ............. 371/8.2 |
| 5,481,694 | A | | 1/1996 | Chao et al. ..................... 395/439 |
| 5,604,863 | A | * | 2/1997 | Allen et al. ...................... 714/11 |
| 5,652,908 | A | * | 7/1997 | Douglas et al. ................... 714/4 |
| 5,790,780 | A | | 8/1998 | Brichta et al. |
| 5,797,005 | A | * | 8/1998 | Bahls et al. .................... 719/314 |
| 5,887,168 | A | * | 3/1999 | Bahls et al. .................... 719/314 |
| 6,385,613 | B1 | | 5/2002 | Grewell et al. ..................... 707/8 |
| 6,393,386 | B1 | | 5/2002 | Zager et al. |
| 6,393,485 | B1 | * | 5/2002 | Chao et al. ..................... 709/231 |
| 6,449,688 | B1 | | 9/2002 | Peters et al. ................... 711/112 |
| 6,625,751 | B1 | | 9/2003 | Starovic et al. |
| 6,732,118 | B2 | | 5/2004 | Hermann et al. |
| 6,785,768 | B2 | | 8/2004 | Peters et al. ................... 711/112 |
| 6,862,696 | B1 | | 3/2005 | Voas et al. |
| 6,974,010 | B2 | | 3/2005 | Sargent |
| 6,934,247 | B2 | * | 8/2005 | Bhattal et al. ................. 370/216 |
| 6,983,321 | B2 | | 1/2006 | Trinon et al. |
| 6,983,362 | B1 | | 1/2006 | Kidder et al. |
| 7,313,573 | B2 | | 12/2007 | Leung et al. |
| 7,325,161 | B1 | | 1/2008 | Rakic et al. |
| 7,437,611 | B2 | | 10/2008 | Agarwal et al. |

(Continued)

FOREIGN PATENT DOCUMENTS

WO WO 99/10814 3/1999

OTHER PUBLICATIONS

Bolie et al., "BPEL Cookbook: Best Practices for SOA-based Integration and Composite Applications Development", 2006, Packt Publishing, ISBN 1904811337; Chapter 1; 12 pages.

(Continued)

*Primary Examiner* — Scott T Baderman
*Assistant Examiner* — Kamini Patel
(74) *Attorney, Agent, or Firm* — Dennis Jung, Esq.; Blanche E. Schiller, Esq.; Heslin Rothenberg Farley & Mesiti P.C.

(57) ABSTRACT

Conditionally performing delegated actions based on runtime conditions of the environment. A component of an Information Technology environment conditionally performs an action, such as its own recovery, based on whether the component can have such action delegated to it and/or whether that component is currently being shared by multiple business applications of the environment.

22 Claims, 15 Drawing Sheets

U.S. PATENT DOCUMENTS

| | | | |
|---|---|---|---|
| 7,490,265 | B2 | 2/2009 | Baskey et al. |
| 7,499,954 | B2 | 3/2009 | Cherkauer et al. |
| 7,509,529 | B2 | 3/2009 | Colucci et al. |
| 7,529,981 | B2* | 5/2009 | Childress et al. ............... 714/48 |
| 7,536,585 | B1 | 5/2009 | Keeton et al. |
| 7,627,728 | B1 | 12/2009 | Roeck et al. |
| 7,730,363 | B2 | 6/2010 | Takezawa et al. |
| 2002/0022952 | A1 | 2/2002 | Zager et al. |
| 2002/0049749 | A1 | 4/2002 | Helgeson et al. |
| 2002/0069102 | A1 | 6/2002 | Vellante et al. |
| 2002/0194045 | A1* | 12/2002 | Shay et al. ......................... 705/8 |
| 2002/0198727 | A1 | 12/2002 | Ann et al. |
| 2003/0084100 | A1 | 5/2003 | Gahan et al. |
| 2003/0135384 | A1 | 7/2003 | Nguyen |
| 2004/0034553 | A1 | 2/2004 | Cole et al. |
| 2004/0143470 | A1 | 7/2004 | Myrick et al. |
| 2004/0158777 | A1 | 8/2004 | Bae et al. ......................... 714/47 |
| 2004/0186905 | A1 | 9/2004 | Young et al. |
| 2005/0015641 | A1 | 1/2005 | Alur et al. |
| 2005/0043977 | A1 | 2/2005 | Ahern et al. |
| 2005/0086091 | A1 | 4/2005 | Trumbly et al. |
| 2005/0125768 | A1 | 6/2005 | Wong et al. |
| 2005/0228852 | A1 | 10/2005 | Santos et al. |
| 2006/0004265 | A1 | 1/2006 | Pulkkinen et al. |
| 2006/0074993 | A1* | 4/2006 | Pulamarasetti et al. ...... 707/200 |
| 2006/0111921 | A1 | 5/2006 | Chang et al. |
| 2006/0117221 | A1 | 6/2006 | Fisher et al. |
| 2006/0123022 | A1 | 6/2006 | Bird |
| 2006/0129562 | A1* | 6/2006 | Pulamarasetti et al. ........ 707/10 |
| 2006/0190583 | A1 | 8/2006 | Whalen |
| 2006/0224702 | A1 | 10/2006 | Schmidt et al. |
| 2006/0245369 | A1 | 11/2006 | Schimmelpfeng et al. |
| 2006/0248546 | A1 | 11/2006 | Andreev et al. |
| 2006/0287875 | A1 | 12/2006 | Reddy et al. |
| 2006/0293942 | A1 | 12/2006 | Chaddha et al. |
| 2007/0011331 | A1 | 1/2007 | Morimoto et al. |
| 2007/0079097 | A1 | 4/2007 | Karnowski et al. |
| 2007/0112847 | A1 | 5/2007 | Dublish et al. |
| 2007/0234408 | A1 | 10/2007 | Burch et al. |
| 2007/0266029 | A1 | 11/2007 | Baskey et al. |
| 2007/0276885 | A1 | 11/2007 | Valiyaparambil et al. |
| 2007/0286219 | A1* | 12/2007 | Knop et al. .................... 370/401 |
| 2008/0016335 | A1 | 1/2008 | Takahashi et al. |
| 2008/0052719 | A1 | 2/2008 | Briscoe et al. |
| 2008/0140495 | A1* | 6/2008 | Bhamidipaty et al. ............. 705/9 |
| 2008/0215909 | A1* | 9/2008 | Bretschneider et al. .......... 714/3 |
| 2009/0125751 | A1* | 5/2009 | Dawson et al. ................... 714/2 |
| 2009/0150456 | A1* | 6/2009 | Balasubramanian et al. 707/202 |
| 2009/0171703 | A1 | 7/2009 | Bobak et al. |
| 2009/0171704 | A1 | 7/2009 | Bobak et al. |
| 2009/0171705 | A1 | 7/2009 | Bobak et al. |
| 2009/0171706 | A1 | 7/2009 | Bobak et al. |
| 2009/0171707 | A1 | 7/2009 | Bobak et al. |
| 2009/0171708 | A1 | 7/2009 | Bobak et al. |
| 2009/0171730 | A1 | 7/2009 | Bobak et al. |
| 2009/0171731 | A1 | 7/2009 | Bobak et al. |
| 2009/0171732 | A1 | 7/2009 | Bobak et al. |
| 2009/0171733 | A1 | 7/2009 | Bobak et al. |
| 2009/0172149 | A1 | 7/2009 | Bobak et al. |
| 2009/0172460 | A1 | 7/2009 | Bobak et al. |
| 2009/0172470 | A1 | 7/2009 | Bobak et al. |
| 2009/0172668 | A1 | 7/2009 | Bobak et al. |
| 2009/0172669 | A1 | 7/2009 | Bobak et al. |
| 2009/0172670 | A1 | 7/2009 | Bobak et al. |
| 2009/0172671 | A1 | 7/2009 | Bobak et al. |
| 2009/0172674 | A1 | 7/2009 | Bobak et al. |
| 2009/0172682 | A1 | 7/2009 | Bobak et al. |
| 2009/0172687 | A1 | 7/2009 | Bobak et al. |
| 2009/0172688 | A1 | 7/2009 | Bobak et al. |
| 2009/0172689 | A1 | 7/2009 | Bobak et al. |
| 2009/0172769 | A1 | 7/2009 | Bobak et al. |
| 2010/0280863 | A1 | 11/2010 | Wilcock et al. |

OTHER PUBLICATIONS

Juric, et al., Business Process Execution Language for Web Services—An Architect and Developer's Guide to Orchestrating Web Services Using BPEL4WS, Second Edition; 2006; Packt Publishing; ISBN 1904811817; Chapter 5; 28 pages.

Horstman et al., Core Java 2: vol. I—Fundamentals (7th Edition); Core Series; 2003; Sun Microsystems, Inc., ISBN 0131472025; pp. 324-327.

Perry, J. Steven, "Java Management Extension: 1st Edition," Jun. 15, 2002; O'Reilly & Associates, Inc.; ISBN 0596002459; Chapter 1 (pp. 1-32) and Chapter 7 (pp. 207-222).

Weerawarana et al., "Web Services Platform Architecture: SOAP, WSDL, WS-Policy, WS-Addressing, WS-BPEL, WS-Reliable Messaging, and More," 2005; Pearson Education, Inc.; ISBN 0131488740; Chapter 14 (pp. 313-340).

Van Bon, Jan, "Foundations of IT Service Management Based on ITIL," Sep. 2005; Van Haren Publishing; ISBN 9077212582; Chapter 6 (pp. 69-85).

Kreger et al., "JAVA and JMX—Building Manageable Systems," Jan. 2003; ISBN 0672324083; pp. 54-64, Mar. 11, 2010.

Evans, James, "Optimization Algorithms for Networks and Graphs, Second Edition", 1992, CCR, ISBN 0824786025, Chapters 1-3 (pp. 1-76) and Chapter 11 (pp. 390-413).

Jolliffe, Ian T., "Principal Component Analyis", 2002, Pringer, ISBN 0387954422, Chapters 1-4 (pp. 1-77), Chapters 6-7 (pp. 111-166) and Chapters 12-14 (pp. 299-405).

Lau, Hang T., "A Java Library of Graph Algorithms and Optimization Discrete Mathmatics and Its Applications," 2006, Chapman & Hall, ISBN 1584887184, Chapter 2.2 (pp. 39-43).

Horstmann, Cay S. et al., Core Java 2—vol. II—Advanced Features (7th Edition), Sun Microsystems Press, 2005, ISBN 0131118269, Chapter 1 (pp. 1-22).

"Parasoft BPEL Maestro," http://www.parasoft.com/jsp/products/home.jsp?product=BPEL.

"BPEL Project", http://www.eclipse.org/bpel/.

"Factor Analysis Using SAS Proc Factor", http://www.utexas.edu/cc/docs/stat53.html.

"Principal Components and Factor Analysis", http://statsoft.com/textbook/stfacan.html.

"WebSphere Intergration Developer", http://www-306.ibm.com/software/integration/wid/about/?S_CMP=rnav.

Office Action for U.S. Appl. No. 11/966,495 dated Oct. 29, 2009.
Office Action for U.S. Appl. No. 11/965,874 dated Mar. 18, 2010.
Office Action for U.S. Appl. No. 11/965,930 dated Apr. 1, 2010.
Office Action for U.S. Appl. No. 11/965,862 dated Jun. 23, 2010.
Final Office Action for U.S. Appl. No. 11/966,495 dated Jun. 14, 2010.
Office Action for U.S. Appl. No. 11/965,872 dated Jul. 6, 2010.
Office Action for U.S. Appl. No. 11/965,855 dated Apr. 30, 2010.
Final Office Action for U.S. Appl. No. 11/966,495 dated May 14, 2010.
Final Office Action for U.S. Appl. No. 11/965,930 dated Sep. 29, 2010.
Final Office Action for U.S. Appl. No. 11/965,874 dated Oct. 14, 2010.
Office Action for U.S. Appl. No. 11/965,862 dated Dec. 7, 2010.
Final Office Action for U.S. Appl. No. 11/965,855 dated Dec. 22, 2010.
Office Action for U.S. Appl. No. 11/965,832 dated Dec. 22, 2010.
Final Office Action for U.S. Appl. No. 11/965,872 dated Dec. 22, 2010.
Patent Application for U.S. Appl. No. 12/975,520, filed Dec. 22, 2010 entitled "Real-Time Information Technology Environments".
Office Action for U.S. Appl. No. 11/965,874 dated Oct. 14, 2010.
Office Action for U.S. Appl. No. 11/965,930 dated Sep. 29, 2010.
"BPEL Project," http://www.eclipse.org/bpel/; retrieved from website Jul. 3, 2008.
"Factor Analysis Using SAS Proc Factor," http://www.utexas.edu/cc/docs/stat53.html, Jun. 26, 1995.
"Principal Components and Factor Analysis," http://statsoft.com/textbook/stfacan.html, Nov. 2005.
"WebSphere Integration Developer", http://www-306.ibm.com/software/integration/wid/about/?s_CMP=rnav, retrieved from website Jul. 3, 2008.
Office Action for U.S. Appl. No. 11/966,619 dated Feb. 2, 2011.
Office Action for U.S. Appl. No. 11/965,926 dated Feb. 3, 2011.
Buchanan, Richard D., et al., "Aligning Enterprise Architecture and IT Investments with Corporate Goals," OMG and Meta Group, 2002, pp. 1-13.
Rood, Melody, A., "Enterprise Architecture: Definition, Content and Utility," IEEE, Jul. 1994, pp. 106-111.

Restriction Requirement for U.S. Appl. No. 11/965,889 dated Feb. 16, 2011.

* cited by examiner

| EVENT LOG | | |
|---|---|---|
| MESSAGE | RESOURCE | DATE |
| i CONTAINMENT REGION HAS RECOVERED | CONTAINMENT1 | APR 18, 2006 10:50:52.193 |
| X CONTAINMENT REGION CREATED FOR RESOURCE FAILURE | CONTAINMENT1 | APR 18, 2006 10:50:52.103 |
| i CONTAINMENT REGION HAS RECOVERED | CONTAINMENT3 | APR 18, 2006 10:50:51.982 |
| X DETECTED DYNAMIC MEMBERSHIP CHANGE: ACTIVE POLICY REED... | RECOVERYSEGMENT2 | APR 18, 2006 10:12:25.696 |
| X THIS RESOURCE HAS ENTERED AN UNRECOVERABLE STATE AND RED... | RECOVERY MANAGER2 | APR 18, 2006 10:12:25.696 |
| X THIS RESOURCE HAS ENTERED AN UNRECOVERABLE STATE AND RED... | RECOVERY MANAGER1 | APR 18, 2006 10:12:14.770 |
| X ACTIVATION OF POLICY 'XYZ' HAS FAILED | RECOVERY SEGMENT1 | APR 18, 2006 10:12:14.760 |
| X DETECTED DYNAMIC MEMBERSHIP CHANGE: ACTIVE POLICY REED... | RECOVERY SEGMENT2 | APR 18, 2006 10:10:25.696 |

THE RESOURCE 'CODER 1 RECOVERY' HAS ENTERED AN UNRECOVERABLE STATE THAT REQUIRES YOUR INPUT. DO YOU WANT TO OPEN THE RESOURCE NOW?

YES   NO

CONDITIONAL ACTIONS BASED ON RUNTIME CONDITIONS OF A COMPUTER SYSTEM ENVIRONMENT

TECHNICAL FIELD

This invention relates, in general, to managing customer environments to provide support for business resiliency, and in particular, to conditionally controlling performance of actions by components of the environment based on runtime conditions of the environment.

BACKGROUND OF THE INVENTION

Today, customers attempt to manually manage and align their availability management with their information technology (IT) infrastructure. Changes in either business needs or the underlying infrastructure are often not captured in a timely manner and require considerable rework, leading to an inflexible environment.

Often high availability solutions and disaster recovery technologies are handled via a number of disparate point products that target specific scopes of failure, platforms or applications. Integrating these solutions into an end-to-end solution is a complex task left to the customer, with results being either proprietary and very specific, or unsuccessful.

Customers do not have the tools and infrastructure in place to customize their availability management infrastructure to respond to failures in a way that allows for a more graceful degradation of their environments. As a result, more drastic and costly actions may be taken (such as a site switch) when other options (such as disabling a set of applications or users) could have been offered, depending on business needs.

Coordination across availability management and other systems management disciplines is either nonexistent or accomplished via non-reusable, proprietary, custom technology.

There is little predictability as to whether the desired recovery objective will be achieved, prior to time of failure. There are only manual, labor intensive techniques to connect recovery actions with the business impact of failures and degradations.

Any change in the underlying application, technologies, business recovery objectives, resources or their interrelationships require a manual assessment of impact to the handcrafted recovery scheme.

SUMMARY OF THE INVENTION

Based on the foregoing, a need exists for a capability that facilitates management of an IT environment. In particular, a need exists for a capability that enables the performance of actions (e.g., recovery) by a component of the environment to be conditionally controlled based on runtime conditions of the environment.

The shortcomings of the prior art are overcome and additional advantages are provided through the provision of a computer-implemented method of controlling performance of actions within an Information Technology (IT) environment. The method includes, for instance, determining, during runtime of an IT environment, whether a given component of the IT environment is being shared at a selected point in time during runtime; and directing the component to take action based on the determining, wherein the action is dependent on whether the resource is being shared at the selected point in time.

Computer program products and systems relating to one or more aspects of the present invention are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 6A depicts one example of a notification view indicating a plurality of notifications, in accordance with an aspect of the present invention;

FIG. 6B depicts one example of a notification message sent to a user, in accordance with an aspect of the present invention;

DETAILED DESCRIPTION OF THE INVENTION

Figure 1:
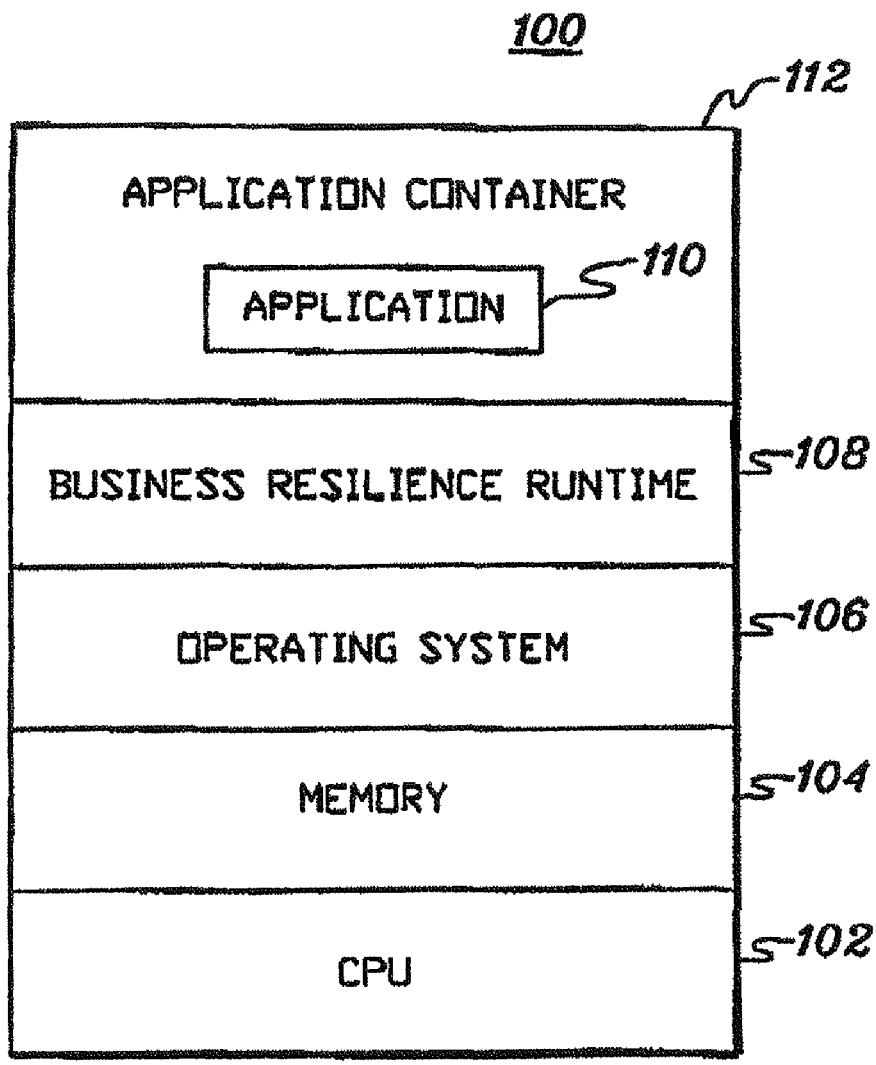
FIG. 1 depicts one embodiment of a processing environment to incorporate and use one or more aspects of the present invention.

In managing a customer's environment, such as its business environment, there is a set of requirements unaddressed by existing technology, which causes unpredictable down time, large impact failures and recoveries, and significant extra labor cost, with resulting loss of business revenue. These requirements include, for instance:

1. Ensuring that there is a consistent recovery scheme across the environment, linked to the business application, across the different types of resources; not a different methodology performed by platform silo. The recovery is to match the scope of the business application, not limited in scope to a single platform. The recovery is to be end-to-end and allow for interaction across multiple vendor products. In one example, a business application is defined as a process that is supported by IT services. It is supportive of the products and/or services created by a customer. It can be of fine granularity (e.g., a specific service/product provided) or of coarse granularity (e.g., a group of services/products provided).
2. Ability to group together mixed resource types (servers, storage, applications, subsystems, network, etc.) into logical groupings aligned with business processes requirements for availability.
3. Ability to share resources across logical groups of resources; ability to nest these logical group definitions, with specifications for goal policy accepted and implemented at each level.
4. Pre-specified recommendations for resource groupings, with customization possible, and pattern matching customer configuration with vendor or customer provided groupings/relationships—to avoid requiring customers to start from scratch for definitions.
5. Ability to group together redundant resources with functional equivalence—use during validation when customer has less redundancy than required to meet the Recovery Time Objective (RTO) goal; in recovery to select an alternate resource for one that has failed.
6. Ability to configure the definition of what constitutes available, degraded, or unavailable based on customer's own sensitivity for a given grouping of resources, and business needs, and further aggregate the state across various resources to produce an overall state for the business application. The state is to be assessed real time, based on what is actually occurring in the system at the time, rather than fixed definitions. In some cases, a performance slowdown might flag a degraded environment, and in other cases, a failure may be necessary before flagging a degraded or unavailable environment. The definitions of available, degraded and unavailable are to be consumed by an availability system that evaluates them in the context of a policy, and then determines appropriate action, including possibly launching recovery automatically.
7. Ability to relate the redundancy capability of relevant resources to the availability status of a business application.
8. Allow customers to configure when recovery actions can be delegated to lower level resources, particularly since resource sharing is becoming more relevant in many customer environments.
9. Include customer or vendor best practices for availability as prespecified workflows, expressed in a standards based manner, that can be customized.
10. Ability to specify quantitative business goals for the recovery of logical groupings of resources, effecting both how the resources are pre-configured for recovery, as well as recovered during errors. One such quantitative goal is Recovery Time Objective (RTO). As part of the specification of quantitative business goals, to be able to include time bias of applications, and facilitate the encoding of appropriate regulatory requirements for handling of certain workloads during changing business cycles in selected businesses, such as financial services.
11. Decomposition of the overall quantified RTO goal to nested logical groups; processing for shared groups having different goals.
12. Ability to configure redundancy groupings and co-location requirements with resources from other vendors, using a representation for resources (which may be, for example, standards based), with ability to clearly identify the vendor as part of the resource definition.
13. Ability to use customer's own historical system measures to automatically generate various system environments, then use these system environments when specifying quantitative recovery goals (since recovery time achievability and requirements are not consistent across time of day, business cycle, etc.). The function is to be able to incorporate historical information from dependent resources, as part of the automatic generation of system environments.
14. Specification of statistical thresholds for acceptability of using historical information; customer specification directly of expected operation times and directive to use customer specified values.
15. Environments are matched to IT operations and time of day, with automatic processing under a new system environment at time boundaries—no automatic internal adjustment of RTO is to be allowed, rather changed if the customer has specified that a different RTO is needed for different system environments.
16. Goal Validation—Prior to failure time. Ability to see assessment of achievable recovery time, in, for instance, a Gantt chart like manner, detailing what is achievable for each resource and taking into account overlaps of recovery sequences, and differentiating by system environment. Specific use can be during risk assessments, management requests for additional recovery related resources, mitigation plans for where there are potentials for RTO miss. Example customer questions:
    What is my expected recovery time for a given application during "end of month close" system environment?
    What is the longest component of that recovery time?
    Can I expect to achieve the desired RTO during the "market open" for stock exchange or financial services applications?
    What would be the optimal sequence and parallelization of recovery for the resources used by my business application?
17. Ability to prepare the environment to meet the desired quantitative business goals, allowing for tradeoffs when shared resources are involved. Ensure that both automated and non-automated tasks can be incorporated into the pre-conditioning. Example of customer question: What would I need to do for pre-conditioning my system to support the RTO goal I need to achieve for this business application?
18. Ability to incorporate operations from any vendors' resources for pre-conditioning or recovery workflows, including specification of which pre-conditioning operations have effect on recoveries, which operations have dependencies on others, either within vendor resources or across resources from multiple vendors.
19. Customer ability to modify pre-conditioning workflows, consistent with supported operations on resources.

20. Ability to undo pre-conditioning actions taken, when there is a failure to complete a transactionally consistent set of pre-conditioning actions; recognize the failure, show customers the optional workflow to undo the actions taken, allow them to decide preferred technique for reacting to the failure—manual intervention, running undo set of operations, combination of both, etc.
21. Ability to divide pre-conditioning work between long running and immediate, nondisruptive short term actions.
22. Impact only the smallest set of resources required during recovery, to avoid negative residual or side effects for attempting to recover a broader set of resources than what is actually impacted by the failure.
23. Choosing recovery operations based on determination of which recovery actions address the minimal impact, to meet goal, and then prepare for subsequent escalation in event of failure of initial recovery actions.
24. Choosing a target for applications and operating systems (OS), based on customer co-location specifications, redundancy groups, and realtime system state.
25. Ability for customer to indicate specific effect that recovery of a given business process can have on another business process—to avoid situations where lower priority workloads are recovered causing disruption to higher priority workloads; handling situations where resources are shared.
26. Ability to prioritize ongoing recovery processing over configuration changes to an availability system, and over any other administration functions required for the availability system.
27. Ability for recoveries and pre-conditioning actions to run as entire transactions so that partial results are appropriately accounted for and backed out or compensated, based on actual effect (e.g., during recovery time or even pre-conditioning, not all actions may succeed, so need to preserve a consistent environment).
28. Allow for possible non-responsive resources or underlying infrastructure that does not have known maximum delays in response time in determining recovery actions, while not going beyond the allotted recovery time.
29. Allow customer to change quantified business recovery goals/targets without disruption to the existing recovery capability, with appropriate labeling of version of the policy to facilitate interaction with change management systems.
30. Allow customers to change logical groupings of resources that have assigned recovery goals, without disruption to the existing recovery capability, with changes versioned to facilitate interaction with change management systems.
31. Ability to specify customizable human tasks, with time specifications that can be incorporated into the goal achievement validation so customers can understand the full time involved for a recovery and where focusing on IT and people time is critical to reducing RTO.
32. There is a requirement/desire to implement dynamically modified redundancy groupings for those resources which are high volume—automatic inclusion based on a specified set of characteristics and a matching criteria.
33. There is a requirement/desire to automatically add/delete resources from the logical resource groupings for sets of resources that are not needing individual assessment.

The above set of requirements is addressed, however, by a Business Resiliency (BR) Management System, of which one or more aspects of the present invention are included. The Business Resiliency Management System provides, for instance:

1. Rapid identification of fault scope.
    Correlation and identification of dependencies between business functions and the supporting IT resources.
    Impact analysis of failures affecting business functions, across resources used within the business functions, including the applications and data.
    Isolation of failure scope to smallest set of resources, to ensure that any disruptive recovery actions effect only the necessary resources.
2. Rapid granular and graceful degradation of IT service.
    Discontinuation of services based on business priorities.
    Selection of alternate resources at various levels may include selection of hardware, application software, data, etc.
    Notifications to allow applications to tailor or reduce service consumption during times of availability constraints.
3. Integration of availability management with normal business operations and other core business processes.
    Policy controls for availability and planned reconfiguration, aligned with business objectives.
    Encapsulation, integration of isolated point solutions into availability IT fabric, through identification of affected resources and operations initiated by the solutions, as well as business resiliency.
    Goal based policy support, associated with Recovery Segments that may be overlapped or nested in scope.
    Derivation of data currency requirements, based on business availability goals.

One goal of the BR system is to allow customers to align their supporting information technology systems with their business goals for handling failures of various scopes, and to offer a continuum of recovery services from finer grained process failures to broader scoped site outages. The BR system is built around the idea of identifying the components that constitute a business function, and identifying successive levels of recovery that lead to more complex constructs as the solution evolves. The various recovery options are connected by an overall BR management capability that is driven by policy controls.

Various characteristics of one embodiment of a BR system include:

1. Capability for dynamic generation of recovery actions, into a programmatic and manageable entity.
2. Dynamic generation of configuration changes required/desired to support a customer defined Recovery Time Objective (RTO) goal.
3. Dynamic definition of key Pattern System Environments (PSEs) through statistical analysis of historical observations.
4. Validation of whether requested RTO goals are achievable, based on observed historical snapshots of outages or customer specified recovery operation time duration, in the context of key Pattern System Environments.
5. BR system dynamic, automatic generation and use of standards based Business Process Execution Language (BPEL) workflows to specify recovery transactions and allow for customer integration through workflow authoring tools.
6. Ability to configure customized scopes of recovery, based on topologies of resources and their relationships, called Recovery Segments (RSs).

7. Best practice workflows for configuration and recovery, including, but not limited to, those for different resource types: servers, storage, network, and middleware, as examples.
8. Ability to customize the definition of available, degraded, unavailable states for Recovery Segments.
9. Ability to represent customers' recommended configurations via best practice templates.
10. Ability to define the impact that recovery of one business application is allowed to have on other business applications.
11. Ability to correlate errors from the same or multiple resources into related outages and perform root cause analysis prior to initiating recovery actions.
12. Quantified policy driven, goal oriented management of unplanned outages.
13. Groupings of IT resources that have associated, consistent recovery policy and recovery actions, classified as Recovery Segments.
14. Handling of situations where the underlying error detection and notifications system itself is unavailable.

A Business Resilience System is capable of being incorporated in and used by many types of environments. One example of a processing environment to incorporate and use aspects of a BR system, including one or more aspects of the present invention, is described with reference to FIG. 1.

Processing environment 100 includes, for instance, a central processing unit (CPU) 102 coupled to memory 104 and executing an operating system 106. Examples of operating systems include AIX® and z/OS®, offered by International Business Machines Corporation; Linux; etc. AIX® and z/OS® are registered trademarks of International Business Machines Corporation, Armonk, N.Y., U.S.A. Other names used herein may be registered trademarks, trademarks or product names of International Business Machines Corporation or other companies.

The operating system manages execution of a Business Resilience Runtime Component 108 of a Business Resilience System, described herein, and one or more applications 110 of an application container 112.

As examples, processing environment 100 includes an IBM® System z™ processor or a pSeries® server offered by International Business Machines Corporation; a Linux server; or other servers, processors, etc. Processing environment 100 may include more, less and/or different components than described herein. (pSeries® is a registered trademark of International Business Machines Corporation, Armonk, N.Y., USA.)

Figure 2:
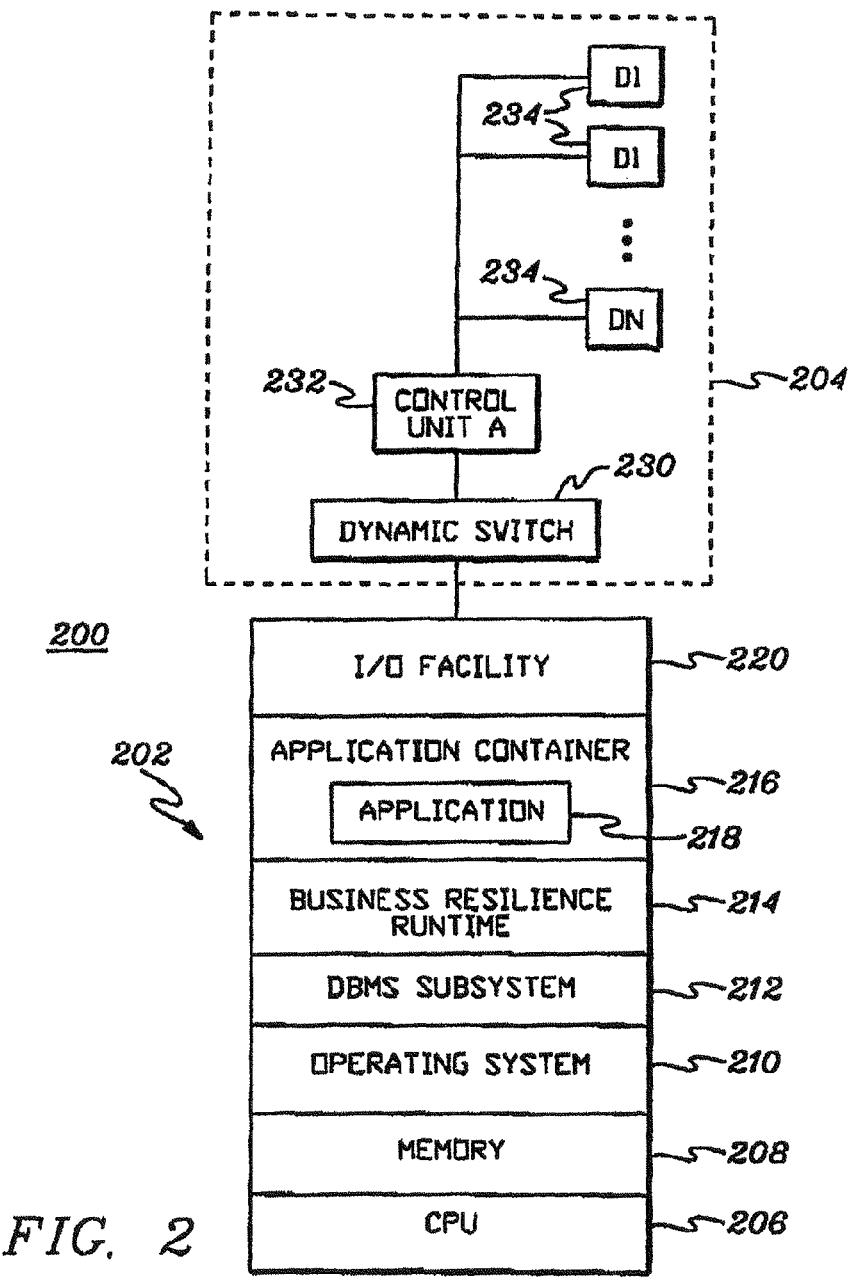
FIG. 2 depicts another embodiment of a processing environment to incorporate and use one or more aspects of the present invention.

Another example of a processing environment to incorporate and use aspects of a BR System, including one or more aspects of the present invention, is described with reference to FIG. 2.

As shown, a processing environment 200 includes for instance, a central processing complex 202 coupled to an input/output (I/O) subsystem 204. Central processing complex 202 includes, for instance, a central processing unit 206, memory 208, an operating system 210, a database management system 212, a Business Resilience Runtime Component 214, an application container 216 including one or more applications 218, and an I/O facility 220.

I/O facility 220 couples central processing complex 202 to I/O subsystem 204 via, for example, a dynamic switch 230. Dynamic switch 230 is coupled to a control unit 232, which is further coupled to one or more I/O devices 234, such as one or more direct access storage devices (DASD).

Processing environments 100 and/or 200 may include, in other embodiments, more, less and/or different components.

Figure 3:
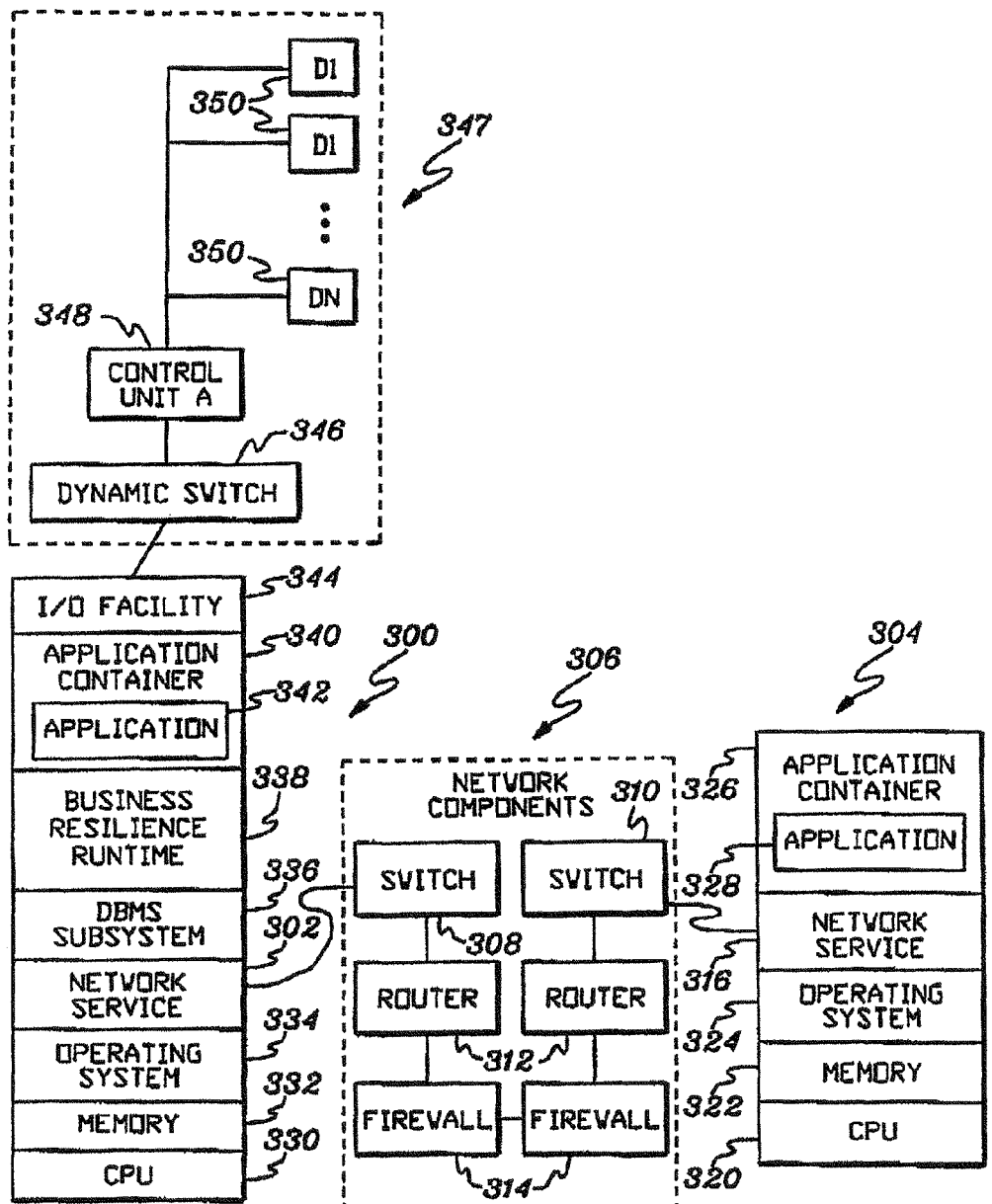
FIG. 3 depicts yet a further embodiment of a processing environment to incorporate and use one or more aspects of the present invention.

In yet another embodiment, a central processing complex 300 (FIG. 3) further includes a network service 302, which is used to couple a central processing complex 300 to a processing environment 304 via a network subsystem 306.

For example, network service 302 of central processing complex 300 is coupled to a switch 308 of network subsystem 306. Switch 308 is coupled to a switch 310 via routers 312 and firewalls 314. Switch 310 is further coupled to a network service 316 of processing environment 304.

Processing environment 304 further includes, for instance, a central processing unit 320, a memory 322, an operating system 324, and an application container 326 including one or more applications 328. In other embodiments, it can include more, less and/or different components.

Moreover, CPC 300 further includes, in one embodiment, a central processing unit 330, a memory 332, an operating system 334, a database management system 336, a Business Resilience Runtime Component 338, an application container 340 including one or more applications 342, and an I/O facility 344. It also may include more, less and/or different components.

I/O facility 344 is coupled to a dynamic switch 346 of an I/O subsystem 347. Dynamic switch 346 is further coupled to a control unit 348, which is coupled to one or more I/O devices 350.

Although examples of various environments are provided herein, these are only examples. Many variations to the above environments are possible and are considered within the scope of the present invention.

In the above-described environments, a Business Resilience Runtime Component of a Business Resilience System is included. Further details associated with a Business Resilience Runtime Component and a Business Resilience System are described with reference to FIG. 4.

In one example, a Business Resilience System 400 is a component that represents the management of recovery operations and configurations across an IT environment. Within that Business Resilience System, there is a Business Resilience Runtime Component (402) that represents the management functionality across multiple distinct Recovery Segments, and provides the service level automation and the support of creation of the recovery sequences. In addition, there are user interface (404), administration (406), installation (408) and configuration template (410) components within the Business Resilience System that enable the administrative operations that are to be performed. Each of these components is described in further detail below.

Business Resilience Runtime Component 402 includes a plurality of components of the BR System that are directly responsible for the collection of observations, creation of PSEs, policy acceptance, validation, error detection, and formulation of recovery sequences. As one example, Business Resilience Runtime Component 402 includes the following components:

1. One or more Business Resilience Managers (BRM) (412).

The Business Resilience Manager (BRM) is the primary component containing logic to detect potential errors in the IT environment, perform assessment to find resources causing errors, and formulate recovery sequences to reestablish the desired state for resources for all Recovery Segments that may be impacted.

The Business Resilience Manager is a component of which there can be one or more. It manages a set of Recovery Segments, and has primary responsibility to formulate recovery sequences. The association of which Recovery Segments are managed by a given BRM is determined at deployment time by the customer, with the help of deployment time templates. BRMs are primarily responsible for operations that relate to error handling and recovery workflow generation, and cross RS interaction.

2. One or more Recovery Segments (RS) (414).

Recovery Segments are customer-defined groupings of IT resources to which consistent availability policy is assigned. In other words, a Recovery Segment acts as a context within which resource recovery is performed. In many cases, Recovery Segments are compositions of IT resources that constitute logical entities, such as a middleware and its related physical resources, or an "application" and its related components.

There is no presumed granularity of a Recovery Segment. Customers can choose to specify fine-grained Recovery Segments, such as one for a given operating system, or a coarser grained Recovery Segment associated with a business process and its component parts, or even a site, as examples.

Relationships between IT resources associated with a RS are those which are part of the IT topology.

Recovery Segments can be nested or overlapped. In case of overlapping Recovery Segments, there can be policy associated with each RS, and during policy validation, conflicting definitions are reconciled. Runtime assessment is also used for policy tradeoff.

The Recovery Segment has operations which support policy expression, validation, decomposition, and assessment of state.

The number of Recovery Segments supported by a BR System can vary, depending on customer configurations and business needs.

One BRM can manage multiple Recovery Segments, but a given RS is managed by a single BRM. Further, Recovery Segments that share resources, or are subset/superset of other Recovery Segments are managed by the same BRM, in this example. Multiple BRMs can exist in the environment, depending on performance, availability, and/or maintainability characteristics.

3. Pattern System Environments (PSEs) (416).

Pattern System Environments (PSEs) are representations of a customer's environment. Sets of observations are clustered together using available mathematical tooling to generate the PSEs. In one embodiment, the generation of a PSE is automatic. A PSE is associated with a given RS, but a PSE may include information that crosses RSs.

As one example, the representation is programmatic in that it is contained within a structure from which information can be added/extracted.

4. Quantified Recovery Goal (418).

A quantified recovery goal, such as a Recovery Time Objective (RTO), is specified for each Recovery Segment that a customer creates. If customers have multiple Pattern System Environments (PSEs), a unique RTO for each PSE associated with the RS may be specified.

5. Containment Region (CR) (420).

Containment Region(s) are components of the BR System which are used at runtime to reflect the scope and impact of an outage. A Containment Region includes, for instance, identification for a set of impacted resources, as well as BR specific information about the failure/degraded state, as well as proposed recovery. CRs are associated with a set of impacted resources, and are dynamically constructed by BR in assessing the error.

The original resources reporting degraded availability, as well as the resources related to those reporting degraded availability, are identified as part of the Containment Region. Impacted resources are accumulated into the topology by traversing the IT relationships and inspecting the attributes defined to the relationships. The Containment Region is transitioned to an inactive state after a successful recovery workflow has completed, and after all information (or a selected subset in another example) about the CR has been logged.

6. Redundancy Groups (RG) (422).

Redundancy Group(s) (422) are components of the BR System that represent sets of logically equivalent services that can be used as alternates when a resource experiences failure or degradation. For example, three instances of a database may form a redundancy group, if an application server requires connectivity to one of the set of three, but does not specify one specific instance.

There can be zero or more Redundancy Groups in a BR System.

Redundancy Groups also have an associated state that is maintained in realtime, and can contribute to the definition of what constitutes available, degraded, or unavailable states. In addition, Redundancy Groups members are dynamically and automatically selected by the BR System, based on availability of the member and co-location constraints.

7. BR Manager Data Table (BRMD) (424).

BR maintains specific internal information related to various resources it manages and each entry in the BR specific Management Data (BRMD) table represents such a record of management. Entries in the BRMD represent IT resources.

8. BR Manager Relationship Data Table (BRRD) (426).

BR maintains BR specific internal information related to the pairings of resources it needs to interact with, and each entry in the BR specific Relationship Data (BRRD) table represents an instance of such a pairing. The pairing record identifies the resources that participate in the pairing, and resources can be any of those that appear in the BRMD above. The BRRD includes information about the pairings, which include operation ordering across resources, failure and degradation impact across resources, constraint specifications for allowable recovery actions, effect an operation has on resource state, requirements for resource to co-locate or anti-co-locate, and effects of preparatory actions on resources.

9. BR Asynchronous Distributor (BRAD) (428).

The BR Asynchronous Distributor (BRAD) is used to handle asynchronous behavior during time critical queries for resource state and key properties, recovery, and for getting observations back from resources for the observation log.

10. Observation Log (430).

The Observation Log captures the information that is returned through periodic observations of the environment. The information in the Observation Log is used by cluster tooling to generate Pattern System Environments (PSE).

11. RS Activity Log (432).

Each RS has an activity log that represents the RS actions, successes, failures. Activity logs are internal BR structures. Primarily, they are used for either problem determination purposes or at runtime, recovery of failed BR components. For example, when the RS fails and recovers, it reads the Activity Log to understand what was in progress at time of failure, and what needs to be handled in terms of residuals.

12. BRM Activity Log (434).

The BRM also has an activity log that represents BRM actions, success, failures. Activity logs are internal BR structures.

13. Transaction Table (TT) (436).

The transaction table is a serialization mechanism used to house the counts of ongoing recovery and preparatory operations. It is associated with the RS, and is referred to as the RS TT.

In addition to the Business Resilience Runtime Component of the BR system, the BR system includes the following components, previously mentioned above.

User Interface (UI) Component (404).

The User interface component is, for instance, a graphical environment through which the customer's IT staff can make changes to the BR configuration. As examples: create and manage Recovery Segments; specify recovery goals; validate achievability of goals prior to failure time; view and alter BR generated workflows.

The user interface (UI) is used as the primary interface for configuring BR. It targets roles normally associated with a Business Analyst, Solution Architect, System Architect, or Enterprise Architect, as examples.

One purpose of the BR UI is to configure the BR resources. It allows the user to create BR artifacts that are used for a working BR runtime and also monitors the behaviors and notifications of these BR resources as they run. In addition, the BR UI allows interaction with resources in the environment through, for instance, relationships and their surfaced properties and operations. The user can add resources to BR to affect recovery and behaviors of the runtime environment.

The BR UI also surfaces recommendations and best practices in the form of templates. These are reusable constructs that present a best practice to the user which can then be approved and realized by the user.

Interaction with the BR UI is based on the typical editor save lifecycle used within, for instance, the developmental tool known as Eclipse (available and described at www.Eclipse.org). The user typically opens or edits an existing resource, makes modifications, and those modifications are not persisted back to the resource until the user saves the editor.

Predefined window layouts in Eclipse are called perspectives. Eclipse views and editors are displayed in accordance with the perspective's layout, which can be customized by the user. The BR UI provides a layout as exemplified in the screen display depicted in FIG. 5A.

Figure 5A:
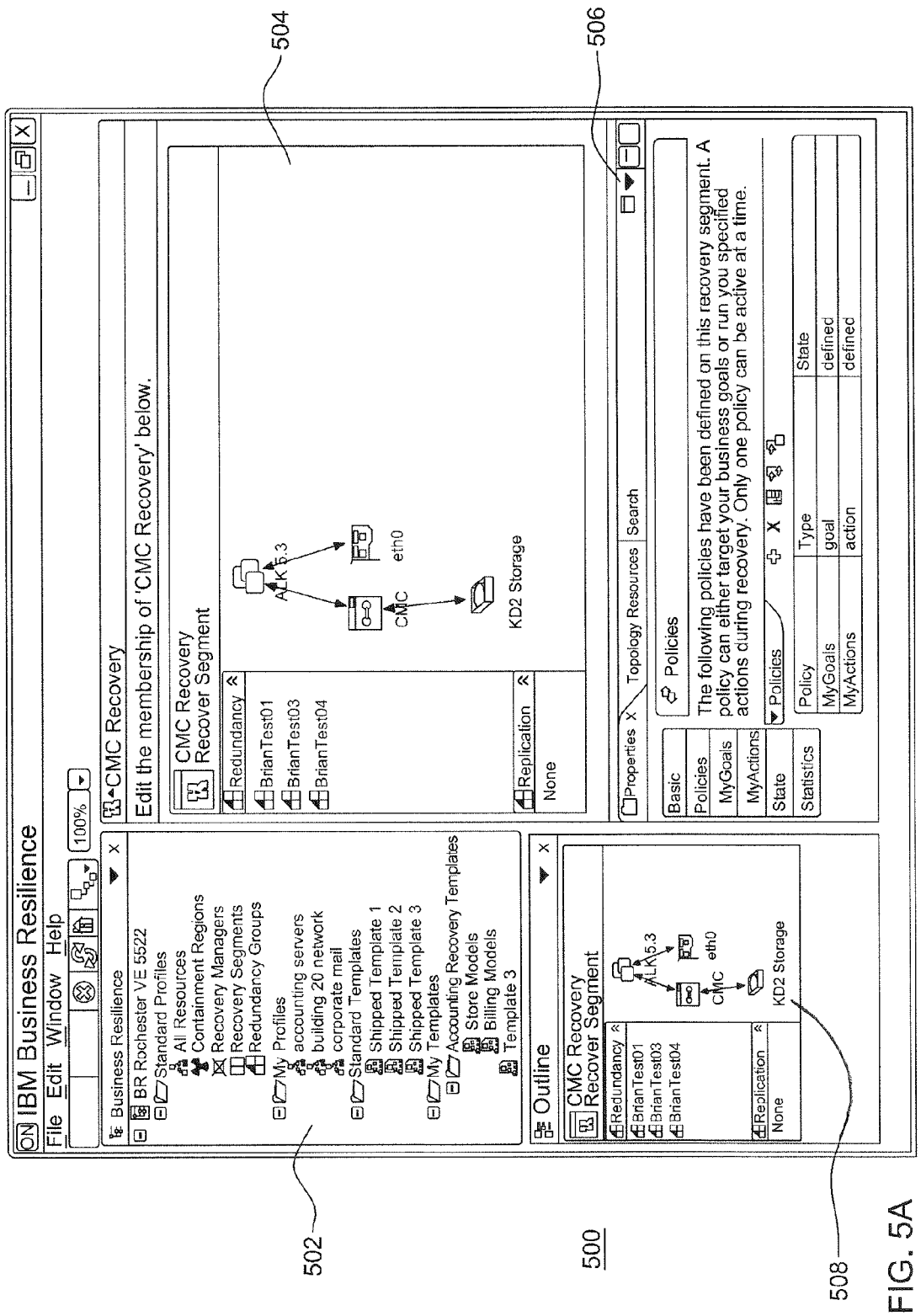
FIG. 5A depicts one example of a screen display of a business resilience perspective, in accordance with an aspect of the present invention.

Screen display 500 depicted in FIG. 5A displays one example of a Business Resilience Perspective. Starting in the upper left corner and rotating clockwise, the user interface includes, for instance:

1. Business Resilience View 502

This is where the user launches topologies and definition templates for viewing and editing.

2. Topology/Definition Template Editor 504

This is where the editors are launched from the Business Resilience View display. The user can have any number of editors open at one time.

3. Properties View/Topology Resources View/Search View 506

The property and topology resource views are driven off the active editor. They display information on the currently selected resource and allow the user to modify settings within the editor.

4. Outline View 508

This view provides a small thumbnail of the topology or template being displayed in the editor. The user can pan around the editor quickly by moving the thumbnail.

Figure 5B:
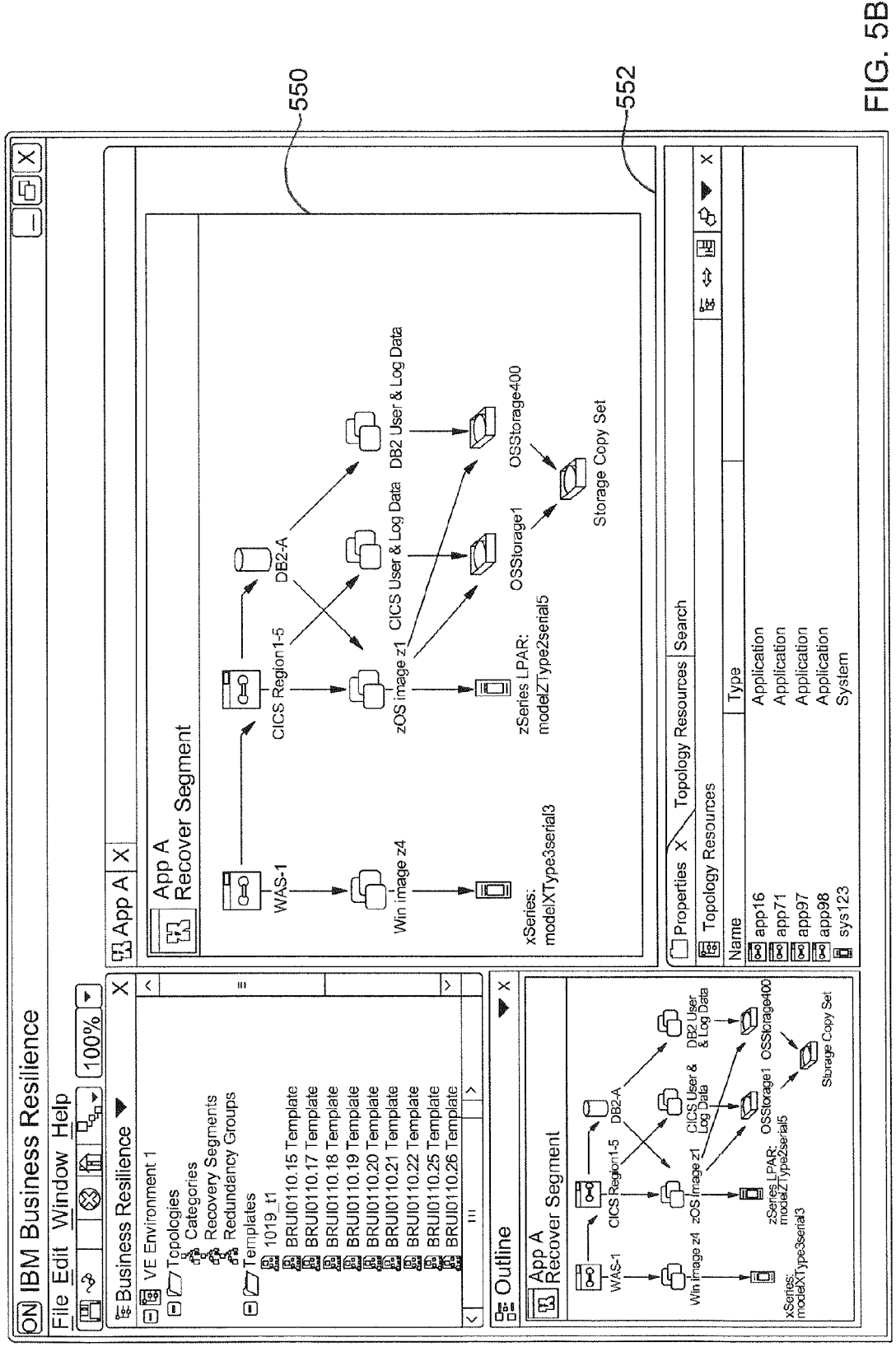
FIG. 5B depicts one example of a screen display of a Recovery Segment, in accordance with an aspect of the present invention.

The topology is reflected by a RS, as shown in the screen display of FIG. 5B. In FIG. 5B, a Recovery Segment 550 is depicted, along with a list of one or more topology resources 552 of the RS (not necessarily shown in the current view of the RS).

In one example, the BR UI is created on the Eclipse Rich Client Platform (RCP), meaning it has complete control over the Eclipse environment, window layouts, and overall behavior. This allows BR to tailor the Eclipse platform and remove Eclipse artifacts not directly relevant to the BR UI application, allowing the user to remain focused, while improving usability.

BR extends the basic user interface of Eclipse by creating software packages called "plugins" that plug into the core Eclipse platform architecture to extend its capabilities. By implementing the UI as a set of standard Eclipse plug-ins, BR has the flexibility to plug into Eclipse, WebSphere Integration Developer, or Rational product installs, as examples. The UI includes two categories of plug-ins, those that are BR specific and those that are specific to processing resources in the IT environment. This separation allows the resource plug-ins to be potentially re-used by other products.

By building upon Eclipse, BR has the option to leverage other tooling being developed for Eclipse. This is most apparent in its usage of BPEL workflow tooling, but the following packages and capabilities are also being leveraged, in one embodiment, as well:

The Eclipse platform provides two graphical toolkit packages, GEF and Draw2D, which are used by BR, in one example, to render topology displays and handle the rather advanced topology layouts and animations. These packages are built into the base Eclipse platform and provide the foundation for much of the tooling and topology user interfaces provided by this design.

The Eclipse platform allows building of advanced editors and forms, which are being leveraged for BR policy and template editing. Much of the common support needed for editors, from the common save lifecycle to undo and redo support, is provided by Eclipse.

The Eclipse platform provides a sophisticated Welcome and Help system, which helps introduce and helps users to get started configuring their environment. Likewise, Eclipse provides a pluggable capability to create task instructions, which can be followed step-by-step by the user to accomplish common or difficult tasks.

Figure 4:
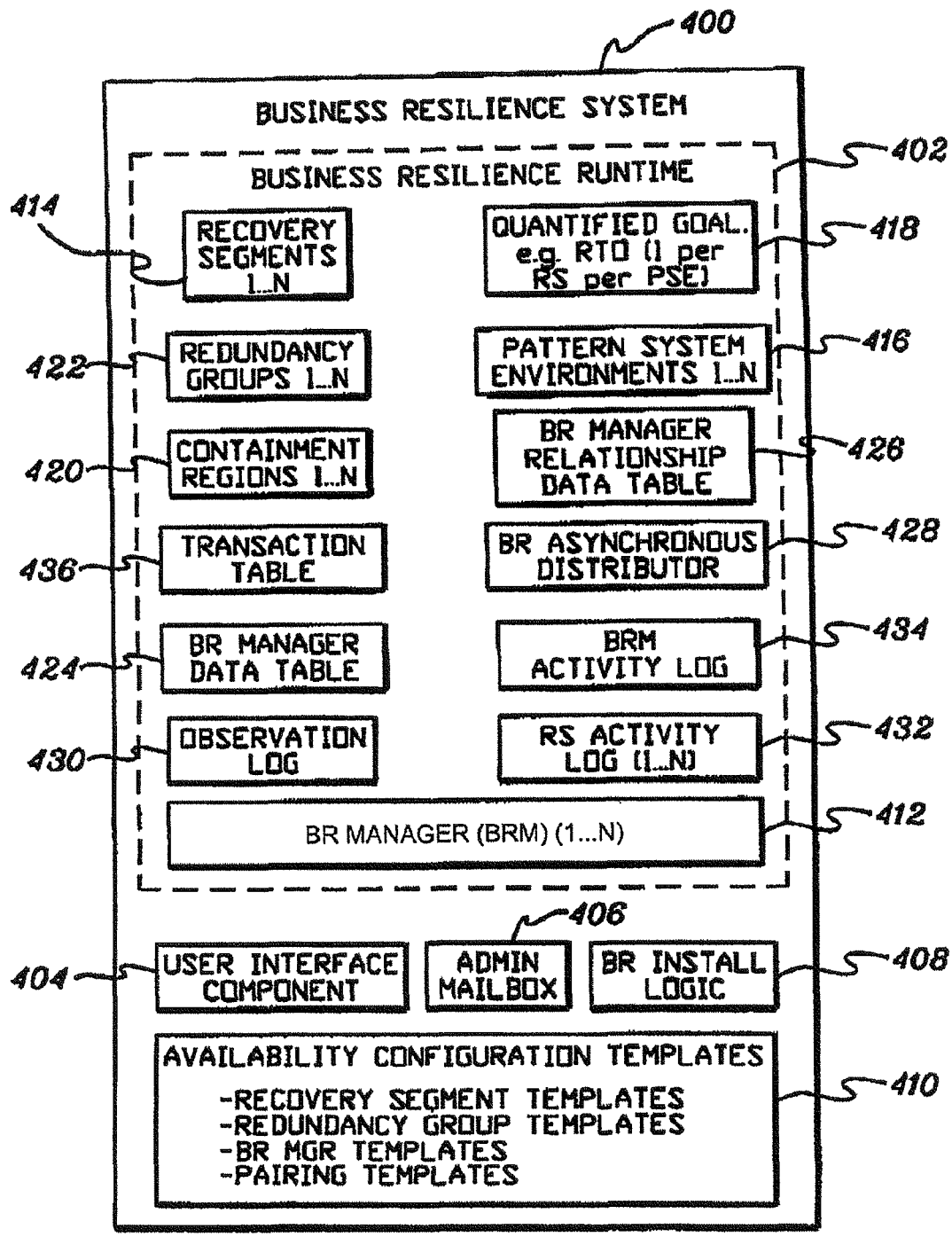
FIG. 4 depicts one embodiment of a Business Resilience System used in accordance with an aspect of the present invention.

BR Admin Mailbox (406) (FIG. 4).
  The BR Admin (or Administrative) Mailbox is a mechanism used by various flows of the BR runtime to get requests to an administrator to take some action. The Admin mailbox periodically retrieves information from a table, where BR keeps an up-to-date state.
  As an example, the Admin Mailbox defines a mechanism where BR can notify the user of important events needing user attention or at least user awareness. The notifications are stored in the BR database so they can be recorded while the UI is not running and then shown to the user during their next session.
  The notifications are presented to the user, in one example, in their own Eclipse view, which is sorted by date timestamp to bubble the most recent notifications to the top. An example of this view is shown in FIG. 6A. As shown, a view 600 is presented that includes messages 602 relating to resources 604. A date timestamp 606 is also included therewith.
  Double clicking a notification opens an editor on the corresponding resource within the BR UI, which surfaces the available properties and operations the user may need to handle the notification.
  The user is able to configure the UI to notify them whenever a notification exceeding a certain severity is encountered. The UI then alerts 650 the user of the notification and message when it comes in, as shown in FIG. 6B, in one example.
  When alerted, the user can choose to open the corresponding resource directly. If the user selects No, the user can revisit the message or resource by using the above notification log view.
BR Install Logic (408) (FIG. 4).
  The BR Install logic initializes the environment through accessing the set of preconfigured template information and vendor provided tables containing resource and relationship information, then applying any customizations initiated by the user.
Availability Configuration Templates (410):
  Recovery Segment Templates
    The BR System has a set of Recovery Segment templates which represent common patterns of resources and relationships. These are patterns matched with each individual customer environment to produce recommendations for RS definitions to the customer, and offer these visually for customization or acceptance.
  Redundancy Group Templates
    The BR System has a set of Redundancy Group templates which represent common patterns of forming groups of redundant resources. These are optionally selected and pattern matched with each individual customer environment to produce recommendations for RG definitions to a customer.
  BR Manager Deployment Templates
    The BR System has a set of BR Manager Deployment templates which represent recommended configurations for deploying the BR Manager, its related Recovery Segments, and the related BR management components. There are choices for distribution or consolidation of these components. Best practice information is combined with optimal availability and performance characteristics to recommend a configuration, which can then be subsequently accepted or altered by the customer.
  Pairing Templates
    The BR System has a set of Pairing Templates used to represent best practice information about which resources are related to each other.
The user interface, admin mailbox, install logic and/or template components can be part of the same computing unit executing BR Runtime or executed on one or more other distributed computing units.

To further understand the use of some of the above components and their interrelationships, the following example is offered. This example is only offered for clarification purposes and is not meant to be limiting in any way.

Figure 7:
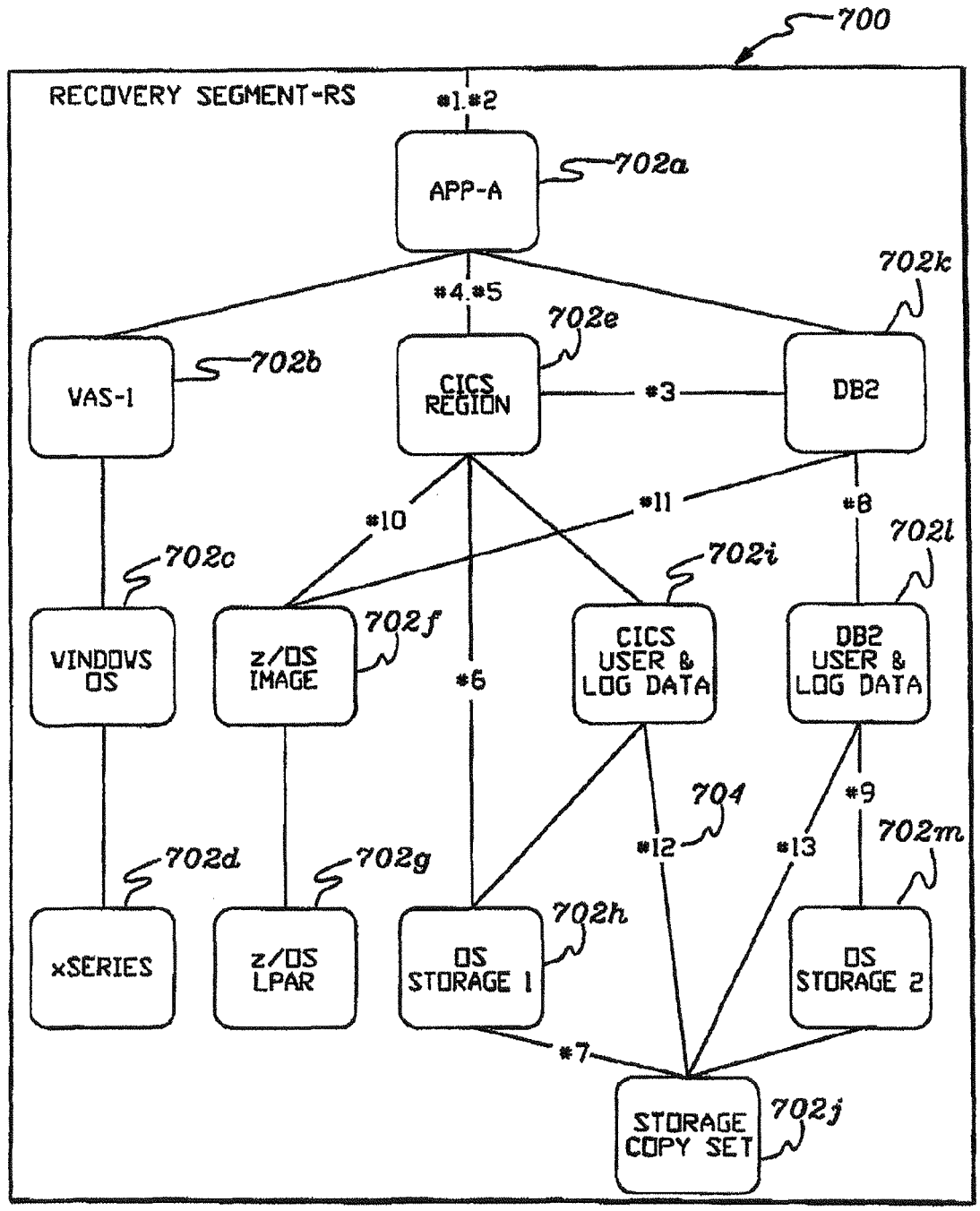
FIG. 7 depicts one example of a Recovery Segment of the Business Resilience System of FIG. 4, in accordance with an aspect of the present invention.

Referring to FIG. 7, a Recovery Segment RS 700 is depicted. It is assumed for this Recovery Segment that:
  The Recovery Segment RS has been defined associated with an instantiated and deployed BR Manager for monitoring and management.
  Relationships have been established between the Recovery Segment RS and the constituent resources 702a-702m.
  A goal policy has been defined and validated for the Recovery Segment through interactions with the BR UI.
  The following impact pairings have been assigned to the resources and relationships:

| Rule | Resource #1 | State | Resource #2 | State |
| --- | --- | --- | --- | --- |
| 1 | App-A | Degraded | RS | Degraded |
| 2 | App-A | Unavailable | RS | Unavailable |
| 3 | DB2 | Degraded | CICS | Unavailable |
| 4 | CICS | Unavailable | App-A | Unavailable |
| 5 | CICS | Degraded | App-A | Degraded |
| 6 | OSStorage-1 | Unavailable | CICS | Degraded |
| 7 | OSStorage-1 | Unavailable | Storage Copy Set | Degraded |
| 8 | DB2 User & Log Data | Degraded | DB2 | Degraded |
| 9 | OSStorage-2 | Unavailable | DB2 User & Log Data | Degraded |
| 10 | z/OS | Unavailable | CICS | Unavailable |
| 11 | z/OS | Unavailable | DB2 | Unavailable |
| 12 | Storage Copy Set | Degraded | CICS User & Log Data | Degraded |
| 13 | Storage Copy Set | Degraded | DB2 User & Log Data | Degraded |

The rules in the above table correspond to the numbers in the figure. For instance, #12 (704) corresponds to Rule 12 above.
Observation mode for the resources in the Recovery Segment has been initiated either by the customer or as a result of policy validation.
The environment has been prepared as a result of that goal policy via policy validation and the possible creation and execution of a preparatory workflow.
The goal policy has been activated for monitoring by BR.
As a result of these conditions leading up to runtime, the following subscriptions have already taken place:
  The BRM has subscribed to runtime state change events for the RS.
  RS has subscribed to state change events for the constituent resources.
These steps highlight one example of an error detection process:
  The OSStorage-1 resource 702h fails (goes Unavailable).
  RS gets notified of state change event.
  $1^{st}$ level state aggregation determines:
    Storage Copy Set→Degraded
    CICS User & Log Data→Degraded
    DB2 User & Log Data→Degraded
    DB2→Degraded
    CICS→Unavailable App-A→Unavailable
1<sup>st</sup> level state aggregation determines:
RS→Unavailable
BRM gets notified of RS state change. Creates the following Containment Region:

| Resource | Reason |
| --- | --- |
| OSStorage-1 | Unavailable |
| Storage Copy Set | Degraded |
| CICS User & Log Data | Degraded |
| DB2 User & Log Data | Degraded |
| DB2 | Degraded |
| App-A | Unavailable |
| CICS | Unavailable |
| RS | Unavailable |

Creates a recovery workflow based on the following resources:

| Resource | State |
| --- | --- |
| OSStorage-1 | Unavailable |
| Storage Copy Set | Degraded |
| CICS User & Log Data | Degraded |
| DB2 User & Log Data | Degraded |
| DB2 | Degraded |
| App-A | Unavailable |
| CICS | Unavailable |
| RS | Unavailable |

In addition to the above, BR includes a set of design points that help in the understanding of the system. These design points include, for instance:

Goal Policy Support

BR is targeted towards goal based policies—the customer configures his target availability goal, and BR determines the preparatory actions and recovery actions to achieve that goal (e.g., automatically).

Availability management of the IT infrastructure through goal based policy is introduced by this design. The BR system includes the ability to author and associate goal based availability policy with the resource Recovery Segments described herein. In addition, support is provided to decompose the goal policy into configuration settings, preparatory actions and runtime procedures in order to execute against the deployed availability goal. In one implementation of the BR system, the Recovery Time Objective (RTO—time to recover post outage) is a supported goal policy. Additional goal policies of data currency (e.g., Recovery Point Objective) and downtime maximums, as well as others, can also be implemented with the BR system. Recovery Segments provide the context for association of goal based availability policies, and are the scope for goal policy expression supported in the BR design. The BR system manages the RTO through an understanding of historical information, metrics, recovery time formulas (if available), and actions that affect the recovery time for IT resources.

RTO goals are specified by the customer at a Recovery Segment level and apportioned to the various component resources grouped within the RS. In one example, RTO goals are expressed as units of time intervals, such as seconds, minutes, and hours. Each RS can have one RTO goal per Pattern System Environment associated with the RS. Based on the metrics available from the IT resources, and based on observed history and/or data from the customer, the RTO goal associated with the RS is evaluated for achievability, taking into account which resources are able to be recovered in parallel.

Based on the RTO for the RS, a set of preparatory actions expressed as a workflow is generated. This preparatory workflow configures the environment or makes alterations in the current configuration, to achieve the RTO goal or to attempt to achieve the goal.

In terms of optimizing RTO, there are tradeoffs associated with the choices that are possible for preparatory and recovery actions. Optimization of recovery choice is performed by BR, and may include interaction at various levels of sophistication with IT resources. In some cases, BR may set specific configuration parameters that are surfaced by the IT resource to align with the stated RTO. In other cases, BR may request that an IT resource itself alter its management functions to achieve some portion of the overall RS RTO. In either case, BR aligns availability management of the IT resources contained in the RS with the stated RTO.

Metrics and Goal Association

In this design, as one example, there is an approach to collecting the required or desired metrics data, both observed and key varying factors, system profile information that is slow or non-moving, as well as potential formulas that reflect a specific resource's use of the key factors in assessing and performing recovery and preparatory actions, historical data and system information. The information and raw metrics that BR uses to perform analysis and RTO projections are expressed as part of the IT resources, as resource properties. BR specific interpretations and results of statistical analysis of key factors correlated to recovery time are kept as BR Specific Management data (BRMD).

Relationships Used By BR, and BR Specific Resource Pairing Information

BR maintains specific information about the BR management of each resource pairing or relationship between resources. Information regarding the BR specific data for a resource pairing is kept by BR, including information such as ordering of operations across resources, impact assessment information, operation effect on availability state, constraint analysis of actions to be performed, effects of preparatory actions on resources, and requirements for resources to co-locate or anti-co-locate.

Evaluation of Failure Scope

One feature of the BR function is the ability to identify the scope and impact of a failure. The BR design uses a Containment Region to identify the resources affected by an incident. The Containment Region is initially formed with a fairly tight restriction on the scope of impact, but is expanded on receiving errors related to the first incident. The impact and scope of the failure is evaluated by traversing the resource relationships, evaluating information on BR specific resource pairing information, and determining most current state of the resources impacted.

Generation and Use of Workflow

Various types of preparatory and recovery processes are formulated and in some cases, optionally initiated. Workflows used by BR are dynamically generated based on, for instance, customer requirements for RTO goal, based on actual scope of failure, and based on any configuration settings customers have set for the BR system.

A workflow includes one or more operations to be performed, such as Start CICS, etc. Each operation takes time to execute and this amount of time is learned based on execution of the workflows, based on historical data in the observation log or from customer specification of execution time for operations. The workflows formalize, in a machine readable, machine editable form, the operations to be performed.

In one example, the processes are generated into Business Process Execution Language (BPEL) compliant workflows with activities that are operations on IT resources or specified manual, human activities. For example, BRM automatically generates the workflows in BPEL. This automatic generation includes invoking routines to insert activities to build the workflow, or forming the activities and building the XML (Extensible Mark-Up Language). Since these workflows are BPEL standard compliant, they can be integrated with other BPEL defined workflows which may incorporate manual activities performed by the operations staff. These BR related workflows are categorized as follows, in one example:

Preparatory—Steps taken during the policy prepare phase in support of a given goal, such as the setting of specific configuration values, or the propagation of availability related policy on finer grained resources in the Recovery Segment composition. BR generates preparatory workflows, for instance, dynamically. Examples of preparatory actions include setting up storage replication, and starting additional instances of middleware subsystems to support redundancy.

Recovery—Steps taken as a result of fault detection during runtime monitoring of the environment, such as, for example, restarting a failed operating system (OS). BR generates recovery workflows dynamically, in one example, based on the actual failure rather than a pre-specified sequence.

Preventive—Steps taken to contain or fence an error condition and prevent the situation from escalating to a more substantial outage or impact; for example, the severing of a failed resource's relationship instances to other resources. Preventive workflows are also dynamically generated, in one example.

Return—Steps taken to restore the environment back to 'normal operations' post recovery, also represented as dynamically generated workflows, as one example.

Capturing of Workflow Information

Since the set of BR actions described above modify existing IT environments, visibility to the actions that are taken by BR prior to the actual execution is provided. To gain trust in the decisions and recommendations produced by BR, the BR System can run in 'advisory mode'. As part of advisory mode, the possible actions that would be taken are constructed into a workflow, similar to what would be done to actually execute the processes. The workflows are then made visible through standard workflow authoring tooling for customers to inspect or modify. Examples of BPEL tooling include:

Bolie, et al., BPEL Cookbook: Best Practices for SOA-based Integration and Composite Applications Development, ISBN 1904811337, 2006, PACKT Publishing, hereby incorporated herein by reference in its entirety;

Juric, et al., Business Process Execution Language for Web Services: BPEL and BPEL YWS, ISBN 1-904811-18-3, 2004, PACKT Publishing, hereby incorporated herein by reference in its entirety.

http://www-306.ibm.com/software/integration/wid/about/?S_CMP=rnav http://www.eclipse.org/bpel/ http://www.parasoft.com/jsp/products/home.jsp;jessionid=aaa56iqFywA-HJ?product=BPEL&redname=googbpelm&referred=searchengine%2Fgoogle%Fbpel Tooling Lifecycle, Support of Managed Resources and Roles BR tooling spans the availability management lifecycle from definition of business objectives, IT resource selection, availability policy authoring and deployment, development and deployment of runtime monitors, etc. In one example, support for the following is captured in the tooling environment for the BR system:

Visual presentation of the IT resources & their relationships, within both an operations and administration context.

Configuration and deployment of Recovery Segments and BRMs.

Authoring and deployment of a BR policy.

Modification of availability configuration or policy changes for BR.

BPEL tooling to support viewing of BR created, as well as customer authored, workflows.

BPEL tooling to support monitoring of workflow status, related to an operations console view of IT resource operational state.

Policy Lifecycle

The policy lifecycle for BR goal policies, such as RTO goals, includes, for example:

Define—Policy is specified to a RS, but no action is taken by the BRM to support the policy (observation information may be obtained).

Validate—Policy is validated for syntax, capability, etc.; preparatory workflow created for viewing and validation by customer.

Prepare—Preparatory action workflows are optionally executed.

Activate—Policy is activated for runtime monitoring of the environment.

Modify—Policy is changed dynamically in runtime.

Configurable State Aggregation

One of the points in determining operational state of a Recovery Segment is that this design allows for customers to configure a definition of specific 'aggregated' states, using properties of individual IT resources. A Recovery Segment is an availability management context, in one example, which may include a diverse set of IT resources.

The customer may provide the rules logic used within the Recovery Segment to consume the relevant IT resource properties and determine the overall state of the RS (available, degraded and unavailable, etc). The customer can develop and deploy these rules as part of the Recovery Segment availability policy. For example, if there is a database included in the Recovery Segment, along with the supporting operating system, storage, and network resources, a customer may configure one set of rules that requires that the database must have completed the recovery of in-flight work in order to consider the overall Recovery Segment available. As another example, customers may choose to configure a definition of availability based on transaction rate metrics for a database, so that if the rate falls below some value, the RS is considered unavailable or degraded, and evaluation of 'failure' impact will be triggered within the BR system. Using these configurations, customers can tailor both the definitions of availability, as well as the rapidity with which problems are detected, since any IT resource property can be used as input to the aggregation, not just the operational state of IT resources.

Failure During Workflow Sequences of Preparatory, Recovery, Preventive

Failures occurring during sequences of operations executed within a BPEL compliant process workflow are intended to be handled through use of BPEL declared compensation actions, associated with the workflow activities that took a failure. The BR System creates associated "undo" workflows that are then submitted to compensate, and reset the environment to a stable state, based on where in the workflow the failure occurred.

Customer Values

The following set of customer values, as examples, are derived from the BR system functions described above, listed here with supporting technologies from the BR system:

Align total IT runtime environment to business function availability objectives:
  RS definition from representation of IT Resources;
  Goal (RTO) and action policy specification, validation and activation; and
  Tooling by Eclipse, as an example, to integrate with IT process management.
Rapid, flexible, administrative level:
  Alteration of operation escalation rules;
  Customization of workflows for preparatory and recovery to customer goals;
  Customization of IT resource selection from RG based on quality of service (QoS);
  Alteration of definition of IT resource and business application state (available, degraded, or unavailable);
  Customization of aggregated state;
  Modification of topology for RS and RG definition;
  Selection of BR deployment configuration;
  Alteration of IT resource recovery metrics;
  Customization of generated Pattern System Environments; and
  Specification of statistical tolerances required for system environment formation or recovery metric usage.
Extensible framework for customer and vendor resources:
  IT resource definitions not specific to BR System; and
  Industry standard specification of workflows, using, for instance, BPEL standards.
Adaptive to configuration changes and optimization:
  IT resource lifecycle and relationships dynamically maintained;
  System event infrastructure utilized for linkage of IT resource and BR management;
  IT resource recovery metrics identified and collected;
  IT resource recovery metrics used in forming Pattern System Environments;
  Learned recovery process effectiveness applied to successive recovery events;
  System provided measurement of eventing infrastructure timing;
  Dynamic formation of time intervals for aggregation of related availability events to a root cause; and
  Distribution of achieved recovery time over constituent resources.
Incremental adoption and coexistence with other availability offerings:
  Potential conflict of multiple managers for a resource based on IT representation;
  Workflows for recovery and preparatory reflect operations with meta data linked to existing operations;
  Advisory mode execution for preparatory and recovery workflows; and
  Incremental inclusion of resources of multiple types.
Support for resource sharing:
  Overlapping and contained RS;
  Merger of CR across RS and escalation of failure scope; and
  Preparatory and recovery workflows built to stringency requirements over multiple RS.
Extensible formalization of best practices based on industry standards:
  Templates and patterns for RS and RG definition;
  Preparatory and recovery workflows (e.g., BPEL) for customization, adoption; and
  Industry standard workflow specifications enabling integration across customer and multiple vendors.
Integration of business resilience with normal runtime operations and IT process automation:
  Option to base on IT system wide, open industry standard representation of resources;
  BR infrastructure used for localized recovery within a system, cluster and across sites; and
  Utilization of common system infrastructure for events, resource discovery, workflow processing, visualization.

Management of the IT environment is adaptively performed, as described herein and in a U.S. patent application Ser. No. 11/966,495 "Adaptive Business Resiliency Computer System for Information Technology Environments," Bobak et al., co-filed herewith, which is hereby incorporated herein by reference in its entirety.

Many different sequences of activities can be undertaken in creating a BR environment. The following represents one possible sequence; however, many other sequences are possible. This sequence is provided merely to facilitate an understanding of a BR system and one or more aspects of the present invention. This sequence is not meant to be limiting in any way. In the following description, reference is made to various U.S. Patent Applications, which are co-filed herewith.

On receiving the BR and related product offerings, an installation process is undertaken. Subsequent to installation of the products, a BR administrator may define the configuration for BR manager instances with the aid of BRM configuration templates.

Having defined the BRM configuration a next step could be to define Recovery Segments as described in "Recovery Segments for Computer Business Applications," Ser. No. 11/965,855, Bobak et al., which is hereby incorporated herein by reference in its entirety.

Definition of a RS may use a representation of resources in a topology graph as described in "Use of Graphs in Managing Computing Environments," Ser. No. 11/965,906, Bobak et al., which is hereby incorporated herein by reference in its entirety.

It is expected that customers will enable BR operation in "observation" mode for a period of time to gather information regarding key metrics and operation execution duration associated with resources in a RS.

At some point, sufficient observation data will have been gathered or a customer may have sufficient knowledge of the environment to be managed by BR. A series of activities may then be undertaken to prepare the RS for availability management by BR. As one example, the following steps may be performed iteratively.

A set of functionally equivalent resources may be defined as described in "Use of Redundancy Groups in Runtime Computer Management of Business Applications," Ser. No. 11/965,877, Bobak et al., which is hereby incorporated herein by reference in its entirety.

Specification of the availability state for individual resources, redundancy groups and Recovery Segments may be performed as described in "Use of Multi-Level State Assessment in Computer Business Environments," Ser. No. 11/965,832, Bobak et al., which is hereby incorporated herein by reference in its entirety.

Representations for the IT environment in which BR is to operate may be created from historical information captured during observation mode, as described in "Computer Pattern System Environment Supporting Business Resiliency," Ser. No. 11/965,851, Bobak et al., which is hereby incorporated herein by reference in its entirety. These definitions provide the context for understanding how long it takes to perform operations which change the configuration—especially during recovery periods.

Information on relationships between resources may be specified based on recommended best practices—expressed in templates—or based on customer knowledge of their IT environment as described in "Conditional Computer Runtime Control of an Information Technology Environment Based on Pairing Constructs," Ser. No. 11/965,874, Bobak et al., which is hereby incorporated herein by reference in its entirety. Pairing processing provides the mechanism for reflecting required or desired order of execution for operations, the impact of state change for one resource on another, the effect execution of an operation is expected to have on a resource state, desire to have one subsystem located on the same system as another and the effect an operation has on preparing the environment for availability management.

With preliminary definitions in place, a next activity of the BR administrator might be to define the goals for availability of the business application represented by a Recovery Segment as described in "Programmatic Validation in an Information Technology Environment," Ser. No. 11/966,619, Bobak et al., which is hereby incorporated herein by reference in its entirety.

Managing the IT environment to meet availability goals includes having the BR system prioritize internal operations. The mechanism utilized to achieve the prioritization is described in "Serialization in Computer Management," Ser. No. 11/965,978, Bobak et al., which is hereby incorporated herein by reference in its entirety.

Multiple operations are performed to prepare an IT environment to meet a business application's availability goal or to perform recovery when a failure occurs. The BR system creates workflows to achieve the required or desired ordering of operations, as described in "Dynamic Generation of Processes in Computing Environments," Ser. No. 11/965,894, Bobak et al., which is hereby incorporated herein by reference in its entirety.

A next activity in achieving a BR environment might be execution of the ordered set of operations used to prepare the IT environment, as described in "Dynamic Selection of Actions in an Information Technology Environment," Ser. No. 11/965,951, Bobak et al., which is hereby incorporated herein by reference in its entirety.

Management by BR to achieve availability goals may be initiated, which may initiate or continue monitoring of resources to detect changes in their operational state, as described in "Real-Time Information Technology Environments," Ser. No. 11/965,930, Bobak et al., which is hereby incorporated herein by reference in its entirety. Monitoring of resources may have already been initiated as a result of "observation" mode processing.

Changes in resource or redundancy group state may result in impacting the availability of a business application represented by a Recovery Segment. Analysis of the environment following an error is performed. The analysis allows sufficient time for related errors to be reported, insures gathering of resource state completes in a timely manner and insures sufficient time is provided for building and executing the recovery operations—all within the recovery time goal, as described in "Management Based on Computer Dynamically Adjusted Discrete Phases of Event Correlation," Ser. No. 11/965,838, Bobak et al., which is hereby incorporated herein by reference in its entirety.

A mechanism is provided for determining if events impacting the availability of the IT environment are related, and if so, aggregating the failures to optimally scope the outage, as described in "Management of Computer Events in a Computer Environment," Ser. No. 11/965,902, Bobak et al., which is hereby incorporated herein by reference in its entirety.

Ideally, current resource state can be gathered after scoping of a failure. However, provisions are made to insure management to the availability goal is achievable in the presence of non-responsive components in the IT environment, as described in "Managing the Computer Collection of Information in an Information Technology Environment," Ser. No. 11/965,917, Bobak et al., which is hereby incorporated herein by reference in its entirety.

With the outage scoped and current resource state evaluated, the BR environment can formulate an optimized recovery set of operations to meet the availability goal, as described in "Defining a Computer Recovery Process that Matches the Scope of Outage," Ser. No. 11/965,862, Bobak et al., which is hereby incorporated herein by reference in its entirety.

Formulation of a recovery plan is to uphold customer specification regarding the impact recovery operations can have between different business applications, as described in "Managing Execution Within a Computing Environment," Ser. No. 11/965,913, Bobak et al., which is hereby incorporated herein by reference in its entirety.

Varying levels of recovery capability exist with resources used to support a business application. Some resources possess the ability to perform detailed recovery actions while others do not. For resources capable of performing recovery operations, the BR system provides for delegation of recovery if the resource is not shared by two or more business applications, as described herein, in accordance with one or more aspects of the present invention.

Having evaluated the outage and formulated a set of recovery operations, the BR system resumes monitoring for subsequent changes to the IT environment.

In support of mainline BR system operation, there are a number of activities including, for instance:

Coordination for administrative task that employ multiple steps, as described in "Adaptive Computer Sequencing of Actions," Ser. No. 11/965,899, Bobak et al., which is hereby incorporated herein by reference in its entirety.

Use of provided templates representing best practices in defining the BR system, as described in "Defining and Using Templates in Configuring Information Technology Environments," Ser. No. 11/965,845, Bobak et al., which is hereby incorporated herein by reference in its entirety.

Use of provided templates in formulation of workflows, as described in "Using Templates in a Computing Environment," Ser. No. 11/965,922, Bobak et al., which is hereby incorporated herein by reference in its entirety.

Making changes to the availability goals while supporting ongoing BR operation, as described in "Non-Disruptively Changing a Computing Environment," Ser. No. 11/965,926, Bobak et al., which is hereby incorporated herein by reference in its entirety.

Making changes to the scope of a business application or Recovery Segment, as described in "Non-Disruptively Changing Scope of Computer Business Applications Based on Detected Changes in Topology," Ser. No. 11/965,889, Bobak et al., which is hereby incorporated herein by reference in its entirety.

Detecting and recovery for the BR system is performed non-disruptively, as described in "Managing Processing of a Computing Environment During Failures of the Environment," Ser. No. 11/965,872, Bobak et al., which is hereby incorporated herein in its entirety.

In order to build a BR environment that meets recovery time objectives, IT configurations within a customer's location are to be characterized and knowledge about the duration of execution for recovery time operations within those configurations is to be gained. IT configurations and the durations for operation execution vary by time, constituent resources, quantity and quality of application invocations, as examples. Customer environments vary widely in configuration of IT resources in support of business applications. Understanding the customer environment and the duration of operations within those environments aids in insuring a Recovery Time Objective is achievable and in building workflows to alter the customer configuration of IT resources in advance of a failure and/or when a failure occurs.

A characterization of IT configurations within a customer location is built by having knowledge of the key recovery time characteristics for individual resources (i.e., the resources that are part of the IT configuration being managed; also referred to as managed resources). Utilizing the representation for a resource, a set of key recovery time objective (RTO) metrics are specified by the resource owner. During ongoing operations, the BR manager gathers values for these key RTO metrics and gathers timings for the operations that are used to alter the configuration. It is expected that customers will run the BR function in "observation" mode prior to having provided a BR policy for availability management or other management. While executing in "observation" mode, the BR manager periodically gathers RTO metrics and operation execution durations from resource representations. The key RTO metrics properties, associated values and operation execution times are recorded in an Observation log for later analysis through tooling. Key RTO metrics and operation execution timings continue to be gathered during active BR policy management in order to maintain currency and iteratively refine data used to characterize customer IT configurations and operation timings within those configurations.

Examples of RTO properties and value range information by resource type are provided in the below table. It will be apparent to those skilled in the art that additional, less, and/or different resource types, properties and/or value ranges may be provided.

| Resource Type | Property | Value Range |
| --- | --- | --- |
| Operating System | Identifier | Text |
| | State | Ok, stopping, planned stop, stopped, starting, error, lost monitoring capability, unknown |
| | Memory Size | Units in MB |
| | Number of systems in sysplex, if applicable | integer |
| | Last IPL time of day | Units in time of day/clock |
| | Type of last IPL | Cold, warm, emergency |
| | Total Real Storage Available | Units in MB |
| | GRS Star Mode | Yes or No |
| | Complete IPL time to reach 'available' | Units of elapsed time |
| | Total CPU using to reach available during IPL | Units of elapsed time |
| | Total CPU delay to reach available during IPL | Units of elapsed time |
| | Total Memory using to reach available during IPL | Units in MB |
| | Total Memory delay to reach available during IPL | Units of elapsed time |
| | Total i/o requests | Integer value, number of requests |
| | Total i/o using to reach available during IPL | Units of elapsed time |
| | Total i/o delay to reach available during IPL | Units of elapsed time |
| Computer System (LPAR, Server, etc.) | Identifier | Text |
| | State | Ok, stopping, stopped, planned down, starting, error, lost monitoring capability, unknown |
| | Type of CPU - model, type, serial | Text value |
| | Number of CPUs | integer |
| | Number of shared processors | integer |
| | Number of dedicated processors | integer |
| | Last Activate Time of Day | Units in time of day/clock |
| Network Components | | |
| Group of Network Connections | Identity | |
| | Operational State | Ok, Starting, Disconnected, Stopping, Degraded, Unknown |
| | State of each associated Network Application Connection | Text |
| | Performance Stats on loss and delays | Complex |
| | Recovery Time for any associated application network connections | Units in elapsed time |

| Resource Type | Property | Value Range |
|---|---|---|
| | Number of active application network connections associated at time of network problem | Integer |
| | Stopped Time/duration for group of connectoins | Units in elapsed time |
| | Maximum Network Recovery Time for any application connection in group | Units in elapsed time |
| | Maximum Number of active connections at time of network problem encountered, for any application connection in group | Integer |
| | Maximum Number of connections processed at time of network recovery, for the group of connections | Integer |
| | Maximum network connection recovery time/duration for any application connection in the group | Units in elapsed time |
| | Maximum Number of connections dropped at time of application network connection recovery, for any application connection in the group | Integer |
| Network Application Connection | Identity | Text |
| | State | Ok, Stopping, Degraded, Error, Unknown |
| | Configuration Settings | Complex |
| | Associated TCP/IP Parameter Settings | Text |
| | Requirement Policies | QoS or BR policies |
| | Performance Statistics, rules, service class, number of active Network OS services | Complex |
| | State update Interval | Units of elapsed time |
| | Last restart time of day | Units in time of day/clock |
| | Last Restart Time/Duration | Units in elapsed time |
| | Network Recovery Time for app connection | Units in elapsed time |
| | Number of active connections at time of network problem encountered, on a per app connection basis | Integer |
| | Number of connections processed at time of network recovery, for the app connection | Integer |
| | application network connection recovery time/duration | Units in elapsed time |
| | Number of connections at time of application network connection problem encountered | Integer |
| | Number of connections processed at time of application network connection recovery | Integer |
| | Number of connections dropped at time of application network connection recovery | Integer |
| Network Host Connection | Identity | Text |
| | State | Ok, Stopping, Degraded, Error, Unknown |
| | Configuration Settings | Complex |
| | Associated TCP/IP Parameter Settings | Text |
| | Requirement Policies | QoS or BR policies |
| | Performance Statistics, rules, service class, number of active Network OS services | Complex |
| | State update Interval | Units of elapsed time |
| | Last restart time of day | Units in time of day/clock |
| | Last Restart Time/Duration | Units in elapsed time |
| | Number of QoS Events, indicating potential degradation | Integer |
| | Number of QoS Events handled, | Integer |
| | Last handled QoS Event | Text |
| Database Subsystem | Name, identifier | Text |
| | Operational State | Operational, Nonoperational, starting, stopping, in recovery, |

-continued

| Resource Type | Property | Value Range |
|---|---|---|
| | | log suspended, backup initiated, restore initiated, restore complete, in checkpoint, checkpoint completed, applying log, backing out inflights, resolving indoubts, planned termination, lost monitoring capability |
| | Time spent in log apply | Units of elapsed time |
| | Time spent during inflight processing | Units of elapsed time |
| | Time spent during indoubt processing | Units of elapsed time |
| | Total time to restart | Units of elapsed time |
| | Checkpoint frequency | Units of time |
| | Backout Duration | Number of records to read back in log during restart processing |
| | CPU Used during Restart | Units of elapsed time |
| | CPU Delay during Restart | Units of elapsed time |
| | Memory Used during Restart | Units in MB |
| | Memory Delay during Restart | Units of elapsed time |
| | I/O Requests during restart | Integer value of number of requests |
| | I/O using during restart | Units of elapsed time |
| | I/O Delay during restart | Units of elapsed time |
| Database Datasharing Group | Identifer | Text |
| | Operational State | Operational, nonoperational, degraded (some subset of members non operational), lost monitoring capability |
| | Number of locks in Shared Facility | Integer value |
| | Time spent in lock cleanup for last restart | Elapsed time value |
| Database | Identifier | Text |
| Tablespace | Identifier | Text |
| Transaction Region | Identifier | Text |
| | Name | Text |
| | Associated job name | Text |
| | Maximum number of tasks/threads | Integer value |
| | Restart type for next restart | Warm, cold, emergency |
| | Forward log name | Text |
| | System log name | Text |
| | Operational State | Operational, nonoperational, in recovery, starting, stop normal first quiesce, stop normal second quiesce, stop normal third quiesce |
| | Time spent in log apply | Units of elapsed time |
| | Time during each recovery stage | Units of elapsed time |
| | Total time to restart | Units of elapsed time |
| | CPU Used during Restart | Units of elapsed time |
| | CPU Delay during Restart | Units of elapsed time |
| | Memory Used during Restart | Units in MB |
| | Memory Delay during Restart | Units of elapsed time |
| | I/O Requests during restart | Integer value of number of requests |
| | I/O connect time during restart | Units of elapsed time |
| | I/O Delay during restart | Units of elapsed time |
| | System Logsize | Units in MB |
| | Forward Logsize | Units in MB |
| | Activity Keypoint frequency | Integer - number of writes before activity checkpoint taken |
| | Average Transaction Rate for this region | Number of transactions per second, on average |
| Transaction Group | Group name | Text |
| Transaction Region File | Filename | Text |
| | Region Name | Text |
| | Dataset Name | Text |
| | Operational State | Operational/enabled, nonoperational/disabled |
| | Open status | Open, closed, closing |
| Transaction | Identifier | Text |
| | Operational State | Running, failed, shunted, retry in progress |

| Resource Type | Property | Value Range |
|---|---|---|
| | Region Name (s) that can run this transaction | Text |
| | Program Name | Text |
| Logical Replication Group of related datasets | Identity | Text |
| | State | |
| | Required currency characteristics for datasets | Complex |
| | Required consistency characteristics for datasets | Complex |
| Replication Group | Identity | |
| | State | |
| Replication Session | Identity | |
| | State | Established, in progress replication, replication successful complete |
| | Type of Session | Flash copy, metro mirror, etc. |
| | Duration of last replication | Units in elapsed time |
| | Time of Day for last replication | Units in time of day/clock |
| | Amount of data replicated at last replication | Units in MB |
| Roleset | Identity | Text |
| | State | |
| CopySet | Identity | Text |
| | State | |
| Dataset | Identity | Text |
| | State | Open, Closed |
| Storage Group | Identity | Text |
| | State | |
| Storage Volume | Identity | Text |
| | State | Online, offline, boxed, unknown |
| Logical Storage Subsystem | Identity | Text |
| | State | |
| Storage Subsystem | Identity | Text |
| | State | |
| | Subsystem I/O Velocity - ratio of time channels are being used | |
| Replication Link (Logical) between Logical Subsystems | Identity | Text |
| | State | Operational, nonoperational, degraded redundancy |
| | Number of configured pipes | Integer |
| | Number of operational pipes | Integer |

Figure 8A:
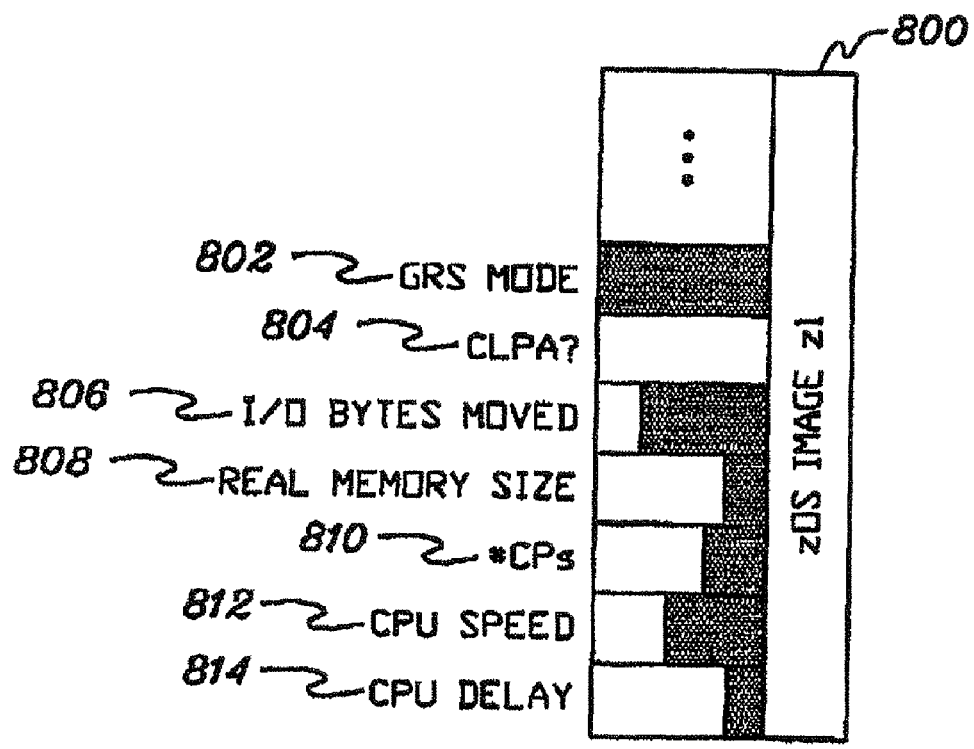
FIG. 8A depicts examples of key Recovery Time Objective properties for a particular resource, in accordance with an aspect of the present invention.

A specific example of key RTO properties for a z/OS® image is depicted in FIG. 8A. As shown, for a z/OS® image 800, the following properties are identified: GRS mode 802, CLPA? (i.e., Was the link pack area page space initialized?) 804, I/O bytes moved 806, real memory size 808, # CPs 810, CPU speed 812, and CPU delay 814, as examples.

Figure 8B:
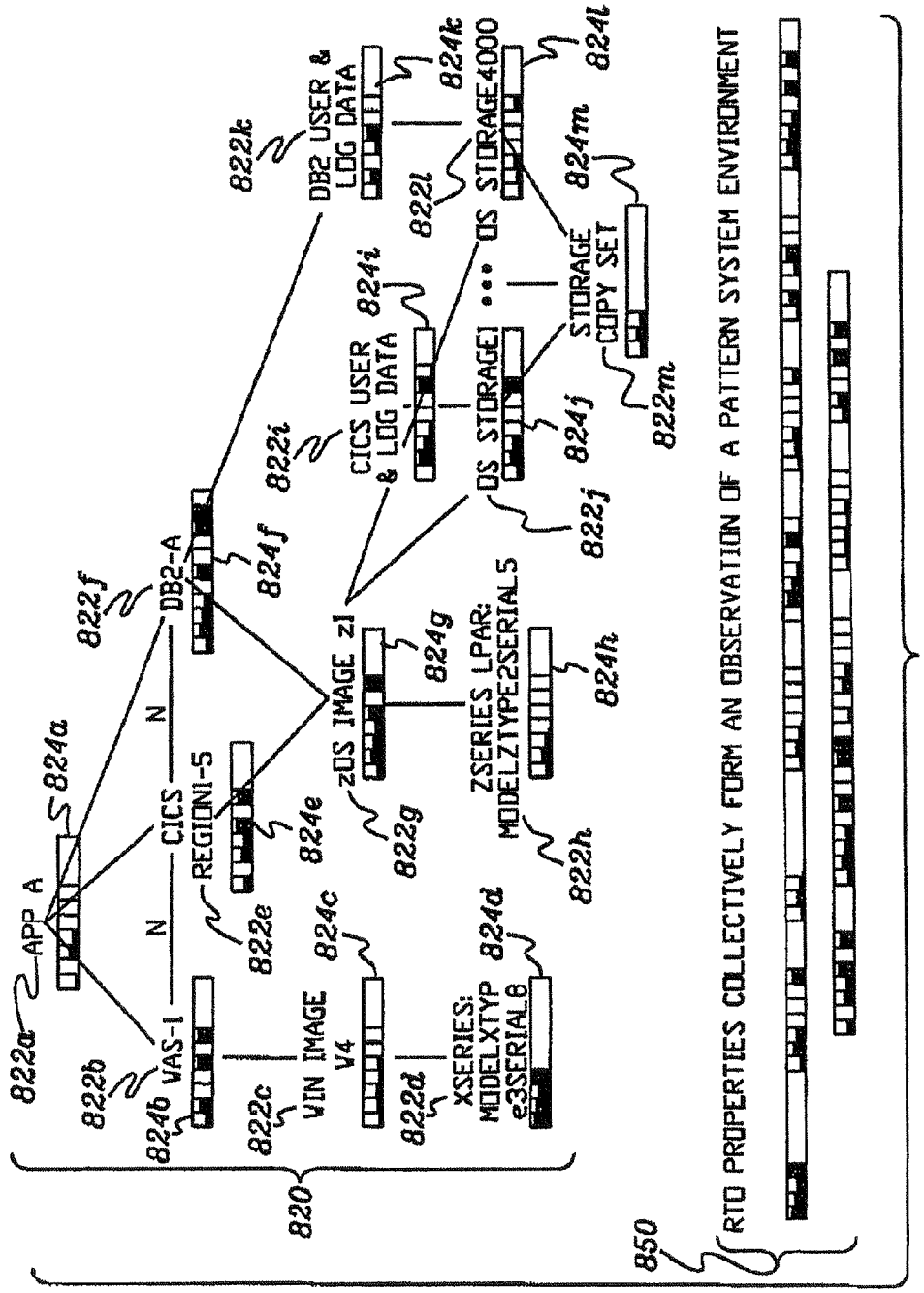
FIG. 8B depicts one example in which Recovery Time Objective properties collectively form an observation of a Pattern System Environment, in accordance with an aspect of the present invention.

The z/OS® image has a set of RTO metrics associated therewith, as described above. Other resources may also have its own set of metrics. An example of this is depicted in FIG. 8B, in which a Recovery Segment 820 is shown that includes a plurality of resources 822*a-m*, each having its own set of metrics 824*a-m*, as indicated by the shading.

Further, in one example, the RTO properties from each of the resources that are part of the Recovery Segment for App A have been gathered by BR and formed into an "observation" for recording to the Observation log, as depicted at 850.

Resources have varying degrees of functionality to support RTO goal policy. Such capacity is evaluated by BR, and expressed in resource property RTOGoalCapability in the BRMD entry for the resource. Two options for BR to receive information operation execution timings are: use of historical data or use of explicitly customer configured data. If BR relies on historical data to make recovery time projections, then before a statistically meaningful set of data is collected, this resource is not capable of supporting goal policy. A mix of resources can appear in a given RS—some have a set of observations that allow classification of the operation execution times, and others are explicitly configured by the customer.

Calculation of projected recovery time can be accomplished in two ways, depending on customer choice: use of historical observations or use of customers input timings. The following is an example of values for the RTOGoalCapability metadata that is found in the BRMD entry for the resource that indicates this choice:

| UseHistoricalObservations | The resource has a collection of statistically meaningful observations of recovery time, where definition of 'statistically valid' is provided on a resource basis, as default by BR, but tailorable by customers |
| UseCustomerInputTimings | The customer can explicitly set the operation timings for a resource |

If the customer is in observation mode, then historical information is captured, regardless of whether the customer has indicated use of explicitly input timings or use of historical information.

The administrator can alter, on a resource basis, which set of timings BR is to use. The default is to use historical observations. In particular, a change source of resource timing logic is provided that alters the source that BR uses to retrieve resource timings. The two options for retrieving timings are from observed histories or explicitly from admin defined times for operation execution. The default uses information from the observed histories, gathered from periodic polls. If the customer defines times explicitly, the customer can direct BR to use those times for a given resource. If activated, observation mode continues and captures information, as well as running averages, and standard deviations. The impact to this logic is to alter the source of information for policy validation and formulation of recovery plan.

With respect to the historical observations, there may be a statistically meaningful set of observations to verify. The sample size should be large enough so that a time range for each operation execution can be calculated, with a sufficient confidence interval. The acceptable number of observations to qualify as statistically meaningful, and the desired confidence interval are customer configurable using BR UI, but provided as defaults in the BRMD entry for the resource. The default confidence interval is 95%, in one example.

There are metrics from a resource that are employed by BR to enable and perform goal management. These include, for instance:

referred to herein as assessed resources. Assessed resources are present primarily to provide observation data for PSE formation, and to understand impact(s) on managed resources. They do not have a decomposed RTO associated with them nor are they acted on for availability by BR. Assessed resources have the following characteristics, as examples:

- Are present to collect observation data for PSE formation.
- Are present to understand impacts on managed resources.
- No decomposed RTO is associated with an assessed resource.
- They are resources on which resources managed by BR depend upon, but are not directly acted on for availability by BR.
- They are resources removed (or not explicitly added) from the actively monitored set of resources by the BR admin during RS definition.
- They are resources that BR does not try to recover and BR thus will not invoke any preparatory or recovery operations on them.

Similarly, there are likely scenarios where a resource exists in a customer environment that already has an alternative availability management solution, and does not require BR for its availability. However, since other resources that are

| Metric | Qualification |
|---|---|
| Last observed recovery/restart time | In milliseconds; or alternately specifying units to use in calculations |
| The key factors and associated values of the resource that affect recovery time | Captured at last observed recovery time, and capturable at a point in time by BR |
| The key factors and associated values of the resource that affect other dependent resources' recovery times | Captured at last observed recovery time, and capturable at a point in time by BR |
| Observed time interval from 'start' state to each 'non-blocking' state | If there are various points in the resource recovery lifecycle at which it becomes non-blocking to other resources which depend upon it, then: Observed time interval from 'start' state to each 'non-blocking' state |
| Resource Consumption Information | If the resource can provide information about its consumption, or the consumption of dependent resources, on an interval basis, then BR will use this information in forming PSEs and classifying timings. One example of this is: cpu, i/o, memory usage information that is available from zOS WLM for an aggregation of processes/address spaces over a given interval. |

There is also a set of information about the resource that is employed—this information is provided as defaults in the BRMD entry for the resource, but provided to the BR team in the form of best practices information/defaults by the domain owners:

- The operational state of the resource at which the observed recovery time interval started.
- The operational state of the resource at which the observed recovery time interval ended.
- The operational states of the resource at which point it can unblock dependent resources (example: operational states at which a DB2 could unblock new work from CICS, at which it could allow processing of logs for transactions ongoing at time of failure . . . ).
- Values of statistical thresholds to indicate sufficient observations for goal managing the resource (number of observations, max standard deviations, confidence level).

In addition to the resources defined herein as part of the IT configuration that is managed, there are other resources, managed by BR may be dependent on them, they are observed and assessed in order to collect observation data and understand their impacts on managed resources. Additionally, there may be resources that do not have alternative management solutions, but the customer simply does not want them managed by BR, but other managed resources are dependent upon them. They too are classified as assessed resources.

These assessed resources share many of the same characteristics of managed resources, such as, for example:

- They have an entry in the BRMD, depending on their use, and the BRMD entry has an indication of assessed vs. managed.
- The RS subscribes to state change notifications for assessed resources (and possibly other notifiable properties).
- Relationships between observed and managed resources are possible (and likely).
- BR monitors for lifecycle events on assessed resources in the same manner as for managed resources.

Assessed resources can be added and/or removed from Recovery Segments.

They can be used to contribute to the aggregated state of an RS.

Finally, there are a few restrictions that BR imposes upon assessed resources, in this embodiment:

Again, BR does not invoke any workflow operations on assessed resources.

A resource that is shared between two Recovery Segments is not categorized as an assessed resource in one RS and a managed resource in the other. It is one or the other in the RS's, but not both.

To facilitate the building of the customer's IT configuration, observations regarding the customer's environment are gathered and stored in an observation log. In particular, the observation log is used to store observations gathered during runtime in customer environments, where each observation is a collection of various data points. They are created for each of the Recovery Segments that are in "observation" mode. These observations are used for numerous runtime and administrative purposes in the BR environment. As examples the observations are used:

To perform statistical analysis from the BR UI to form characterizations of customers' normal execution environments, represented in BR as Pattern System Environments (PSE).

To classify operations on resources into these PSEs for purposes of determining operation execution duration.

Help determine approximate path length of operations that are pushed down from BR to the resources, and possibly to the underlying instrumentation of each resource.

Help determine approximate path length of activities executed within BPEL workflows.

Finally, the data collected via the observation is also used to update the metadata associated with the resource (i.e., in the BRMD table) where appropriate.

BR gathers observations during runtime when "observation mode" is enabled at the Recovery Segment level. There are two means for enabling observation mode, as examples:

1. The BR UI allows the administrator to enable observation mode at a Recovery Segment, which will change its "ObservationMode" resource property to "True", and to set the polling interval (default=15 minutes). The Recovery Segment is defined in order to allow observation mode, but a policy does not have to be defined or activated for it.

2. Once a policy is defined though and subsequently activated, observation mode is set for the Recovery Segment (due to the data being used in managing and monitoring the customer's environment). Thus, it is set automatically at policy activation, if not already set explicitly by the administrator (see 1 above) using the default polling interval (15 minutes).

The administrator may also disable observation mode for a Recovery Segment, which stops it from polling for data and creating subsequent observation records for insertion in the log. However, the accumulated observation log is not deleted. In one example, an RS remains in observation mode throughout its lifecycle. The UI displays the implications of disabling observation mode.

In BR, the observations that are collected by BR during runtime can be grouped into two categories, as examples:

1. Periodic poll.
2. Workflow (includes workflow begin/end, and workflow activity begin/end).

A periodic poll observation is a point-in-time snapshot of the constituent resources in a Recovery Segment. Observation data points are collected for those resources in the Recovery Segment(s) which have associated BR management data for any of the following reasons, as examples:

1. Resource has RTO properties.
2. Resource has operations.
3. Resource participates in the aggregated state for the Recovery Segment, in which it is contained.
4. Resource participates in any of the six types of pairing rules.

The full value of these observations is derived for an RS when they include data that has been gathered for its constituent resources, plus the resources that those are dependent upon. In one embodiment, the administrator is not forced to include all dependent resources when defining a Recovery Segment, and even if that were the case, there is nothing that prevents them from deleting various dependent resources. When defining a Recovery Segment, the BR UI provides an option that allows the customer to display the dependency graph for those resources already in the Recovery Segment. This displays the topology from the seed node(s) in the Recovery Segment down to and including the dependent leaf nodes. The purpose of this capability is to give the customer the opportunity to display the dependent nodes and recommend that they be included in the Recovery Segment.

Preparatory and recovery workflows are built by the BR manager to achieve the customer requested RTO policy based on resource operations timings. During active policy monitoring by the BR manager, measurements of achieved time for operations are recorded in observations to the log and used to maintain the running statistical data on operation execution times. Observations written to the log may vary in the contained resource RTO metrics and operation execution timings.

Observations are also collected from any of the BPEL workflows created by BR in the customer's environment. There is a standard template that each BR BPEL workflow uses. As part of that template, observation data is captured at the start of, during, and at the completion of each workflow. Specifically, in one example, one observation is created at the end of the workflow with data accumulated from completion of each activity. This information is used to gather timings for workflow execution for use in creating subsequent workflows at time of failure.

In accordance with an aspect of the present invention, a component of an IT environment conditionally performs an action (e.g., its own recovery) based upon whether the component can have such action delegated to it and/or whether that component is currently being shared by multiple business applications.

One example of a component that may be selected for delegation is a resource of an IT environment. In particular, certain types of resources support the ability to have a set of actions or policy delegated to them from a higher level management scope. There are cases where these resources are not shared by more than one business application, and there are cases where these resources are shared by more than one application. Management of an IT infrastructure is to handle both cases, and is to take into account customer specified/tailored information of the effect that one resource's action (e.g., recovery) is allowed to have on another.

Some resources can also assess errors and formulate recovery actions within a defined scope. The actions taken by these resources are in the context of recovering a scope of failure, which may be significantly more narrow than the set of IT resources operating to achieve ongoing operation for an enterprise business application. Moreover, the recovery actions taken by these resources may need to be varied dependent on the criticality of the business application that is utilizing the resource. Increased complexity occurs if such a resource is utilized by more than one business application where there is a disparity in criticality between the two or more business applications. Customers require the ability to determine and manage:

If a resource is to perform error analysis and perform recovery operations;

Recovery of the resource in the context of the set of IT components acting to provide continued service for the business application which may be combinations of servers, storage, network, operating system and middleware components;

Apply differentiated level of recovery dependent on the criticality of the business application impacted;

Limit actions taken to recovery for less critical business applications if a negative impact will occur to business applications of greater criticality.

Existing services do not provide the level of control required or desired by customers for IT resources shared by two or more business applications of different criticality, or for IT resources on which operations are to be executed on behalf of two or more management disciplines acting on independent policy directives. Specifically, adequate level of control is not provided where resources have built in operations to perform recovery and where that needs to be coordinated across an entire business application's recovery.

In accordance with an aspect of the present invention, a structure of resource and resource relationship information is utilized in support of BR processing to determine, for example:

If a resource is capable of performing error assessment and taking error recovery action;

If a resource is capable of providing recovery operation execution times;

If a resource is capable of having BR directly alter configuration parameters to achieve specified goals, such as a recovery time objective (RTO);

If a resource is capable of altering configuration parameters to meet an apportioned portion of an overall goal (e.g., RTO) for the business application; and If such a resource is shared between two or more business applications.

BR performs analysis of resource capabilities and based on resource capabilities and the current runtime environment:

Apportions an increment of overall business application goal (e.g., RTO) to the resource;

Utilizes interfaces to direct the recovery actions of a resource capable of having recovery assessment and actions delegated to it;

Detects changes in the environment which make the resource shared and alters the actions of a resource capable of being delegated to;

Gathers recovery operation execution timings for subsequent use in validating goal objectives and in constructing preparatory and recovery workflows.

Support for delegation of recovery decisions is built on representations of resources, and their relationship(s) to Recovery Segments (RS(s)). In one implementation, a business application is programmatically represented by a RS. When a RS is defined, resources are associated with the RS. If a resource is shared among two or more RSs, there exists the possibility of conflicts in recovery decisions (or other actions), as the resource is associated with two or more business applications, which may have different quantitative management goals, such as Recovery Time Objective (RTO) goals. Determination of recovery actions are performed by BR for shared resources utilizing the context of the business applications which are utilizing the shared resource.

RTO goals are specified by the customer at a Recovery Segment level and apportioned to the various component resources grouped within the RS by the BR system. There are RTO goals expressed as units of time intervals, such as seconds, minutes, and hours. RTO at the RS level is apportioned to the individual resources, as target recovery times, taking into account parallel or overlapping restart capability. Optimization of recovery choice is performed by BR, and may include interaction at various levels of sophistication with a managed resource. In some cases, BR may set specific configuration parameters that are surfaced by the manageable resource to align with the stated RTO. In other cases, BR may request that a manageable resource itself alter its management functions to achieve some portion of the overall RS RTO. Functional capabilities of a resource are expressed as BR management data on the resource. A resource which is capable of being delegated recovery assessment and recovery actions may support one or more of multiple interfaces. These interfaces are, for instance, programmatic interfaces that indicate to the resource that a particular action is to be taken. These interfaces can be implemented in a number of ways, including, but not limited to, as application programming interfaces (APIs) invoked through macros; as events that are listened for; as messages that are monitored for, etc. Examples of supported interfaces include, for instance:

1. The ability to surface recovery operation execution times;
2. Enablement and disablement of delegated responsibility for performing error assessment and error recovery;
3. Accept apportioned RTO goal for independent action by the resource when delegated to by BR;
4. Interfaces to alter configuration parameters directly at the request of BR (e.g., change log checkpoint frequency to 6 seconds); or
5. On directive by BR, perform alteration of necessary configuration parameters by the resource (e.g., alter processing to achieve 10 second recovery time which causes the database subsystem to alter log checkpoint frequency to 6 seconds).

Resources which can be shared by two or more business applications may enable two interfaces if those resources support delegation for independent error assessment and error recovery. One interface indicates that the resource is capable of being delegated to. An interface may be provided which accepts specification of an apportioned RTO time for the resource to attempt to achieve. Another interface which supports enabling or disabling of recovery decision and recovery action taken by the resource may be provided. BR examines each resource in a RS when the RS is made actively monitored for RTO goal management. For resource(s) which support being delegated to, BR attempts to determine what the apportionment of RTO to the resource can be while still meeting the overall RTO for the RS. BR determines if the resource is associated with a single RS or multiple RS(s). If a resource is associated with a single RS and supports being delegated to, BR utilizes the resource supported interface enabling delegation when the RS is made actively monitored for RTO goal management. Otherwise, BR does not enable the resource for delegated recovery decision and recovery action processing. If a resource becomes shared between two RSs by being added to a RS, BR utilizes the resource supported interface disabling delegation to the resource.

If a resource is not shared and does support delegation of recovery decisions and recovery actions, it may recover from error conditions or may fail to recover from error conditions.

If a resource recovers an error condition, its state reflects that recovery is in progress and if recovery was successful or failed. If recovery is successful, and assuming no impact to other resource(s) is caused by recovery, BR takes no further action. If a resource delegated to fails to recover, BR is notified of the state change of the resource and take actions in accordance with error processing.

If a resource is shared and is capable of being delegated to for recovery decisions and recovery actions, but has been prohibited from doing so by BR invoking the interface to disable delegated actions, the resource is obligated to transition state to reflect the error rather than attempt recovery. When the resource transitions state, BR initiates error processing which includes forming recovery operations.

The following customer example highlights one case where delegation is critical to a large enterprise financial sector customer—here called ABC. At ABC, there exists two business applications which use a common set of data. A mission critical application relies on a large collection of storage volumes. A non-mission critical application also uses these same storage volumes, as well as a few additional storage volumes. ABC chooses to have the total set of these storage volumes replicated using a synchronous replication technology, such as IBM's Peer-to-Peer Remote Copy (PPRC) facility to insure there is data consistency if a switch from the primary to the alternate is required. However, if the only failure is with a volume required solely by the non-mission critical business application, ABC will not tolerate the hyperswap time required to move to the alternate volumes of the PPRC session. This is because the hyperswap time puts at risk losing the subsystem (e.g., CICS) regions for the mission critical business application. During the time I/O is frozen for the hyperswap, transactions back up on the subsystem region causing it to go "short on storage" (SOS) which will likely cause a region failure. So the objective stated is to have a RTO for the case where both applications are to be recovered, but preclude the non-critical application from compromising the business critical application.

Validation of Availability Goal Processing

Validation of achievability of a goal policy, such as an availability goal policy, may be initiated by the BR administrator through the BR UI and may be achieved in multiple ways. In one implementation, policy validation may occur in multiple discrete steps including, for example:

Check for syntax;
Check that any subset policy being validated has a RTO less than that of a superset;
Analyze the operation timings for resource recovery operations, choosing appropriate actions, and invoking a Gantt chart build to obtain a maximum path length time for recovering the resources;
Invoke generate prep workflow to obtain an ordered list of preparatory operations.

Alternatively, validation may be manually performed by inspection of IT resource capabilities including current state and measured timings for execution of recovery operations.

Evaluation of recovery operations for a resource establishes acceptable time duration for recovery of the business application represented by an RS. If a resource can have recovery processing delegated to it, the acceptable recovery processing execution duration is provided to enable the resource to comply. To insure a resource can comply with required recovery operation time, changes to the configuration of the resource may also be performed by the resource. For example, a database resource may alter the log frequency in order to insure achievability of recovery time processing.

Activation of Availability Goal Processing

Policy activation is driven by an administrator when the administrator wants to make a policy current for monitoring of the RTO goal associated with the policy. An RS with active monitoring for RTO achievement receives notification of changes to resource state, property/value pairs and operation execution timings to be initiated, as examples. Queries can be achieved through multiple means including directly invoking interfaces provided by the resource to return data. Any suitable communications mechanism for requesting and receiving resource data may be acceptable. In one implementation, BR may use asynchronous data gathering, an implementation of which is described in "Managing the Computer Collection of Information in an Information Technology Environment," Bobak et al., Ser. No. 11/965,917, which is hereby incorporated herein by reference in its entirety. Data returned on operation execution duration may be utilized during policy validation when establishing achievability of a desired availability goal.

Activation processing determines if resources are shared and if delegation for recovery processing is to be performed. One embodiment of the logic to activate resource delegation is described with reference to FIG. 9. As one example, RS performs this logic.

Figure 9:
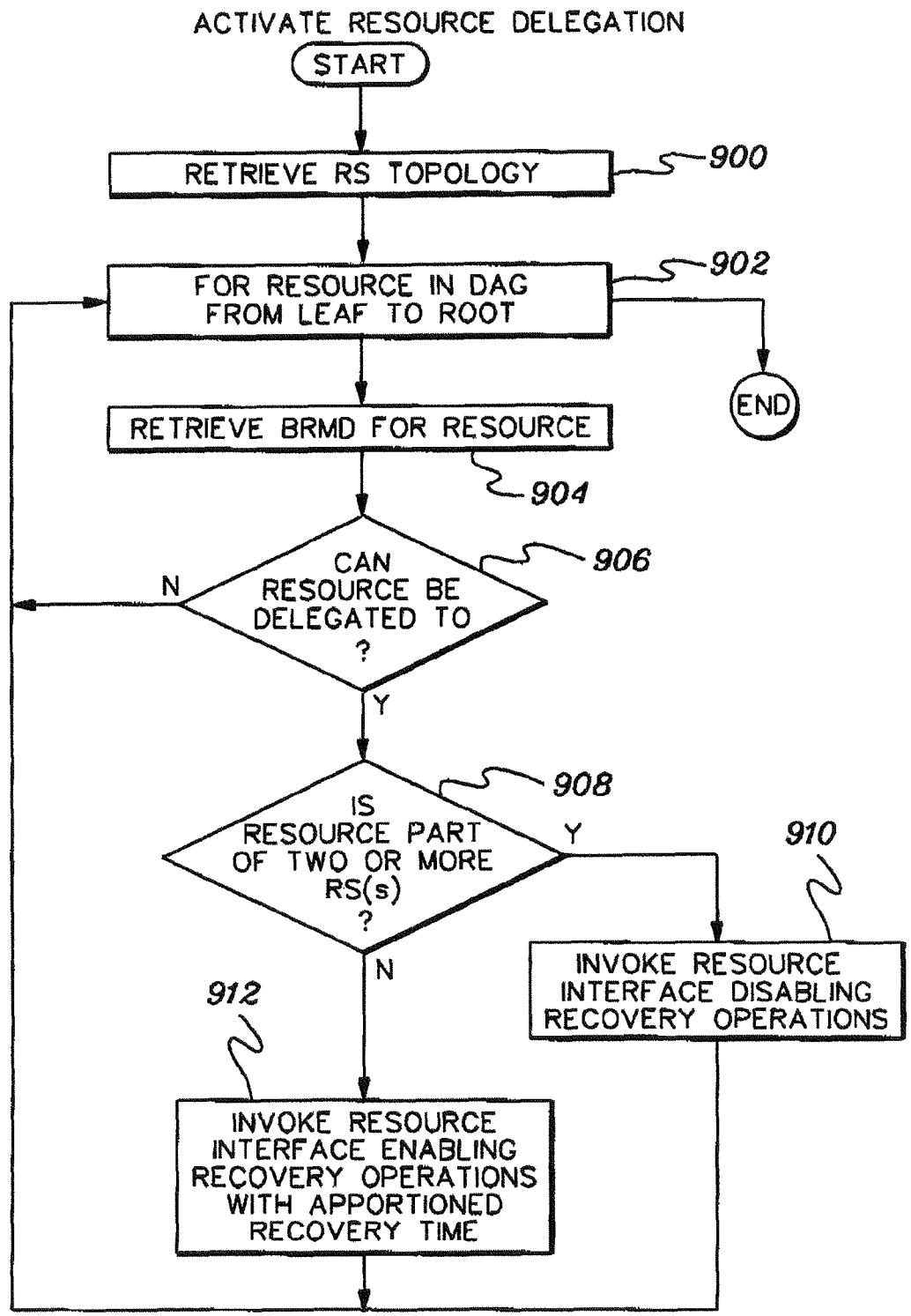
FIG. 9 depicts one embodiment of the logic to activate resource delegation, in accordance with an aspect of the present invention.

Referring to FIG. 9, processing retrieves the topology reflecting the resources which are part of the RS, STEP 900. For each resource in the topology DAG from leaf resources to root resources, STEP 902, the BR management data associated with the resource is retrieved from the BRMD table, STEP 904. (In another embodiment, a DAG is not used, but instead, a list of resources is provided or any other mechanism that indicates the appropriate resources.)

If the resource can be delegated to as indicated by the retrieved data, INQUIRY 906, and if the resource is part of two or more RS(s), as also indicated by the retrieved data, INQUIRY 908, the resource interface disabling recovery operations is invoked, STEP 910, and processing continues at STEP 902. This interface indicates to the resource that it is to turn off its own recovery processing. The manner in which recovery is disabled is resource dependent.

Otherwise, if the resource is not part of two or more RS(s), INQUIRY 908, the resource interface enabling recovery operations is invoked and the allowable time for the resource to complete recovery is provided as an apportionment of the overall RTO, STEP 912. As one example, the apportioned time for recovery is the time used for recovery of the resource in validation of the RTO. Specifically, this interface indicates to the resource that it is to perform its own recovery. Again, the manner in which recovery is performed is resource dependent. However, no matter how recovery is performed, it is to be within the specified goal or an error, as one example, is presented.

Thereafter, processing returns to STEP 902.

Returning to INQUIRY 906, if a resource cannot be delegated to, processing returns to STEP 902.

Remove Resource From RS

Resources can be removed from a RS if they are no longer associated with providing the business application's function. One embodiment of the logic associated with removing a resource is described with reference to FIG. 10. As one example, the RS component of the BR performs this logic.

Figure 10:
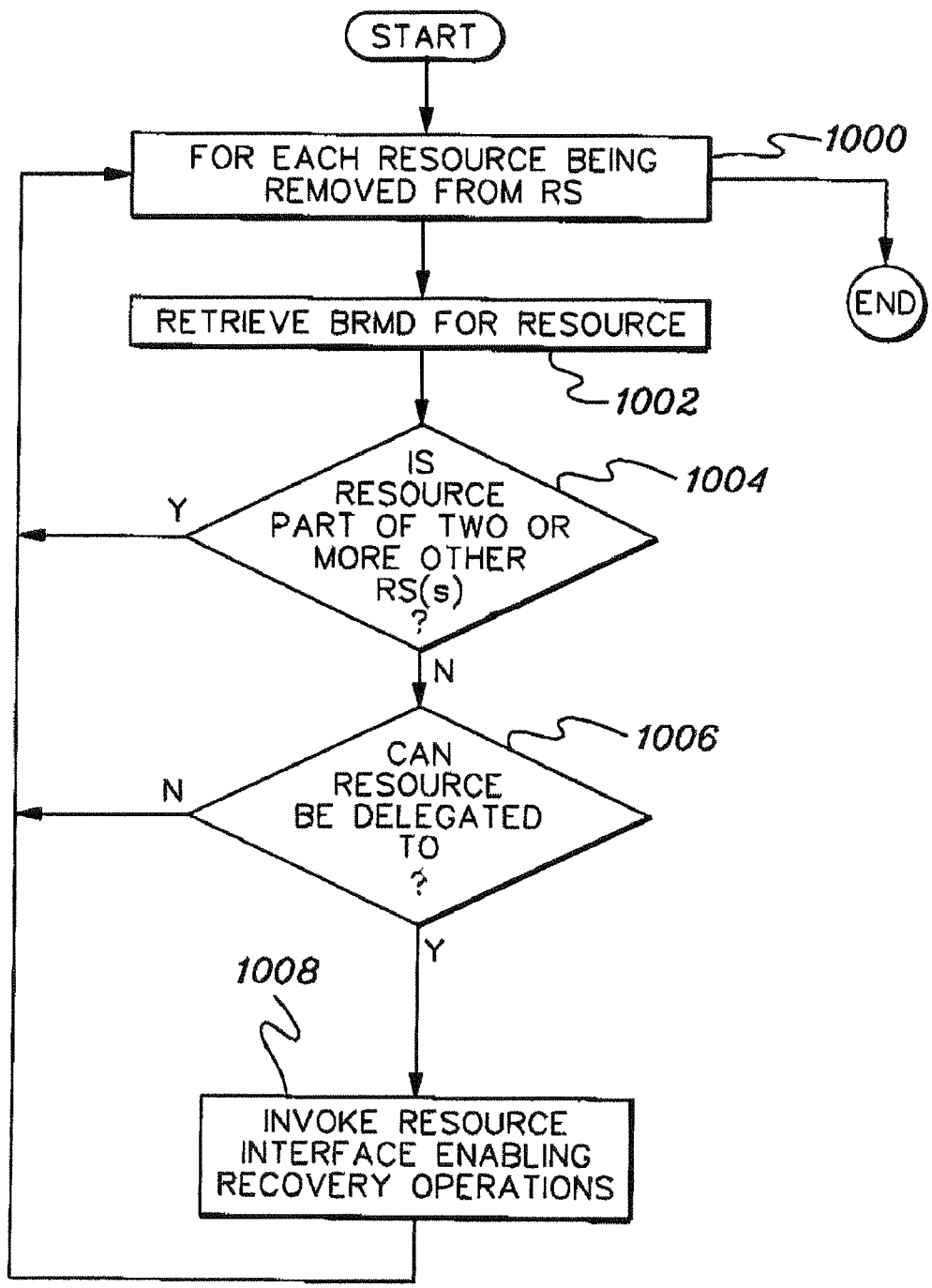
FIG. 10 depicts one embodiment of the logic to remove a resource from a Recovery Segment, in accordance with an aspect of the present invention.

Referring to FIG. 10, for each resource being removed from a RS, STEP 1000, the BRMD entry is retrieved, STEP 1002. If the resource is part of two or more RS(s) other than the one it is being removed from, INQUIRY 1004, processing proceeds with the next resource, STEP 1000. Otherwise, the resource is part of one or no RS. If the resource can be delegated to, INQUIRY 1006, the resource interface enabling recovery operations is invoked, STEP 1008. As one example, the apportioned time for recovery is the time used for recovery of the resource in validation of the RTO. Processing then continues with STEP 1000.

Returning to INQUIRY 1006, if the resource cannot be delegated to, processing continues with STEP 1000.

Add Resource to RS

Resources can be added to a RS if they are utilized to provide the function of the business application. One embodiment of the logic to add a resource is described with reference to FIG. 11. As one example, the RS component of the BR system performs this logic.

Figure 11:
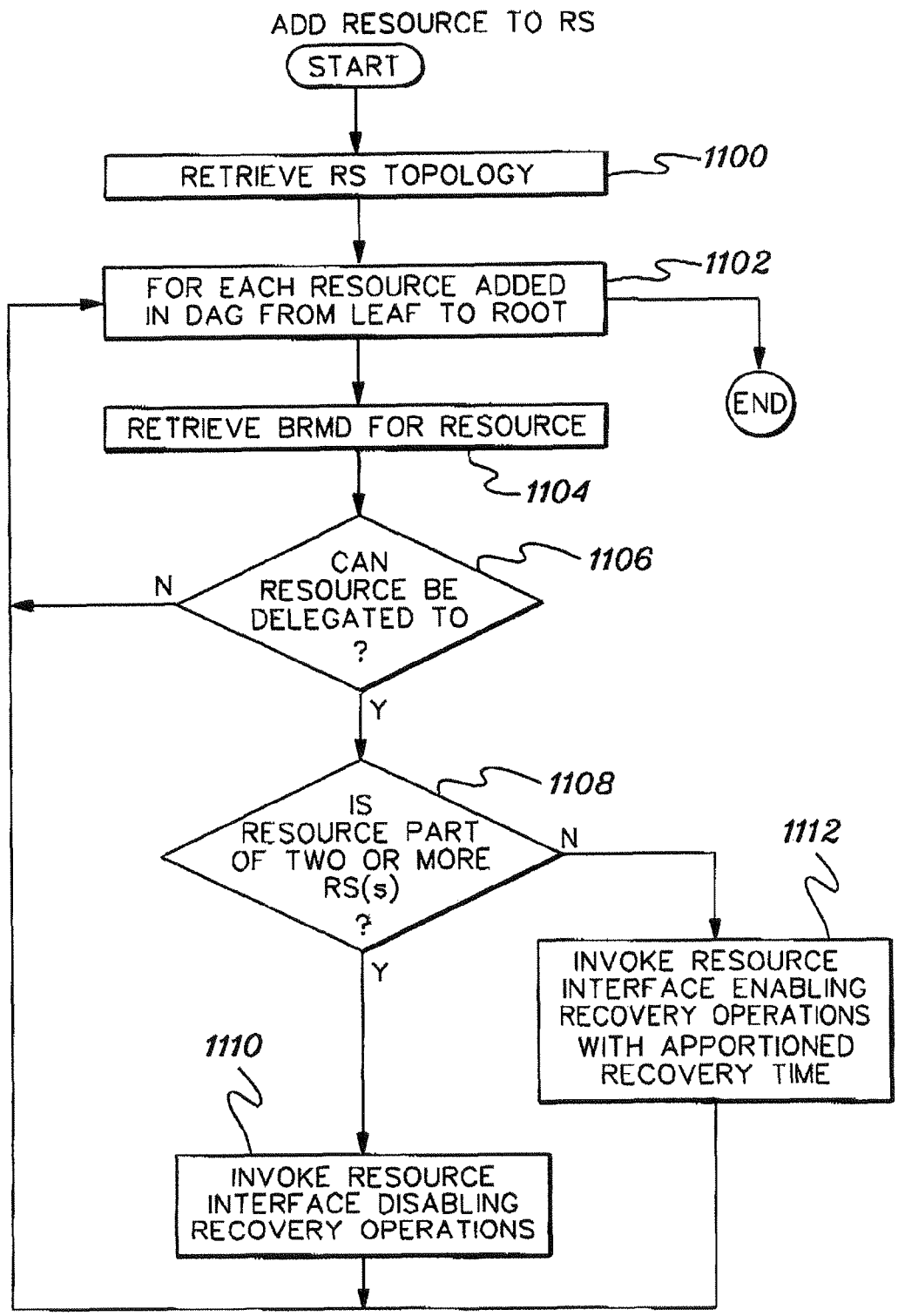
FIG. 11 depicts one embodiment of the logic to add a resource to a Recovery Segment, in accordance with an aspect of the present invention.

Referring to FIG. 11, the RS topology of resources is retrieved, STEP 1100, and each added resource in the topology DAG is evaluated from leaf resources to root resources, STEP 1102. For instance, the BRMD associated with the resource is retrieved, STEP 1104, and a determination is made as to whether the resource can be delegated to, INQUIRY 1106. If the resource can be delegated to, a determination is made on the number of RS(s) in which the resource participates, INQUIRY 1108. If the resource is part of two or more RS(s), the resource interface disabling recovery operation is invoked, STEP 1110, and processing continues at STEP 1102. Otherwise, the resource interface enabling recovery operations is invoked, STEP 1112, and an apportioned recovery time within which the resource is to complete recovery processing is provided. As one example, the apportioned time for recovery is the time used for recovery of the resource in validation of the RTO. Processing then continues at STEP 1102.

Returning to INQUIRY 1106, if the resource cannot be delegated to, processing continues at STEP 1102.

Deactivate RS Monitoring

Through the UI, the BR administrator may initiate termination of active monitoring of a RS to achieve an availability goal. One embodiment of the logic to deactivate RS monitoring is described with reference to FIG. 12. As one example, this logic is performed by the RS component of the BR system.

Figure 12:
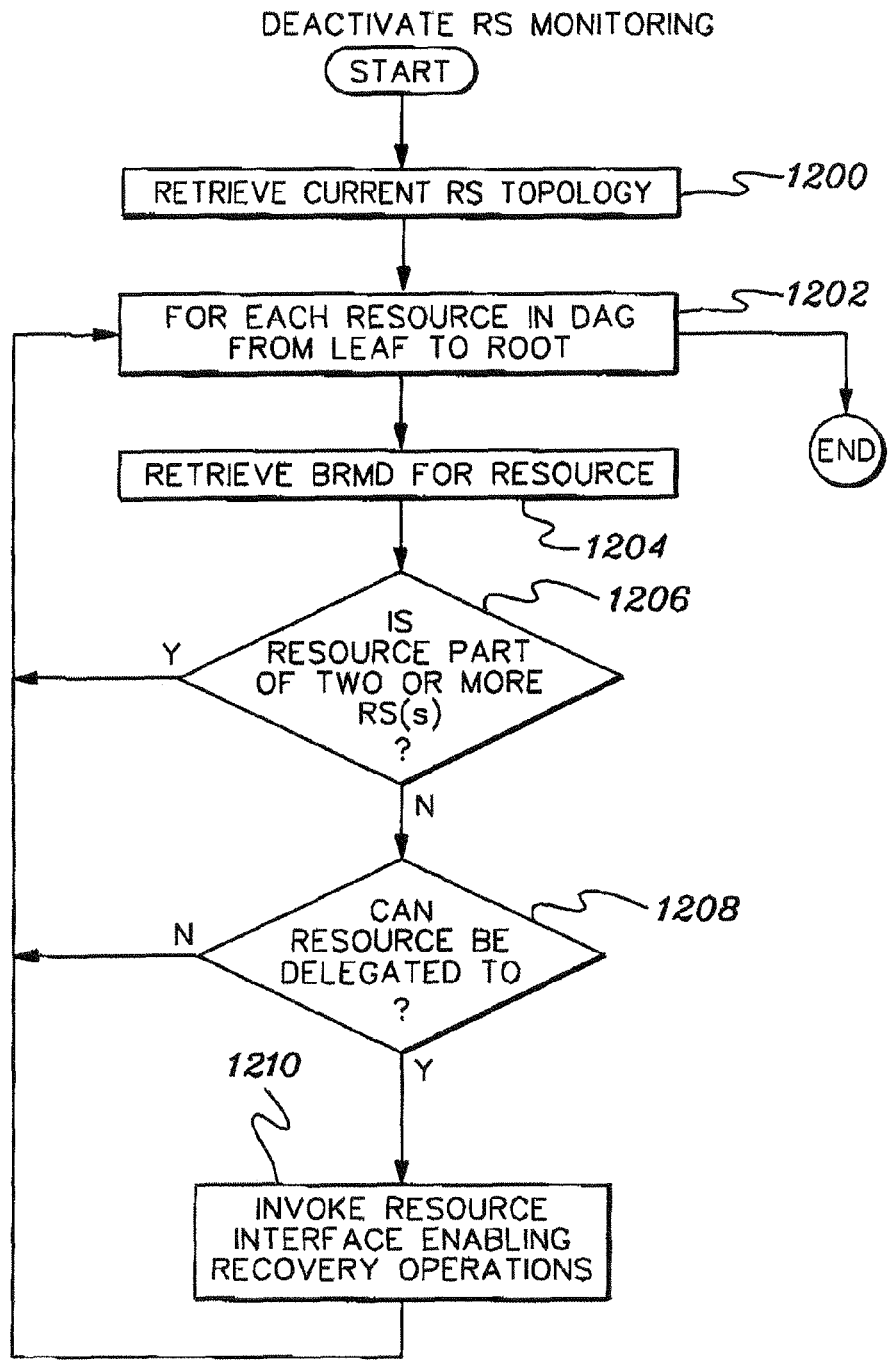
FIG. 12 depicts one embodiment of the logic to deactivate RS monitoring, in accordance with an aspect of the present invention.

Referring to FIG. 12, processing performed by the RS for delegation begins by accessing the RS topology, STEP 1200. For each resource in the topology DAG from leaf resource to root resource, STEP 1202, the BRMD for the resource is retrieved, STEP 1204. If the resource is part of two or more RS(s) after monitoring is discontinued for the RS processing the BR administrator's request, INQUIRY 1206, the next resource is evaluated, STEP 1202. Otherwise, if the resource can be delegated to, INQUIRY 1208, the resource interface enabling recovery operations is invoked, STEP 1210. As one example, the apportioned time for recovery is the time used for recovery of the resource in validation of the RTO. Processing then continues at STEP 1202.

Returning to INQUIRY 1208, if the resource cannot be delegated to, processing returns to STEP 1202. This concludes deactivate RS monitoring.

Described in detail herein is a capability for conditionally controlling, based on current state of a runtime environment, when a resource is to take a particular action, such as its own recovery.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Figure 13:
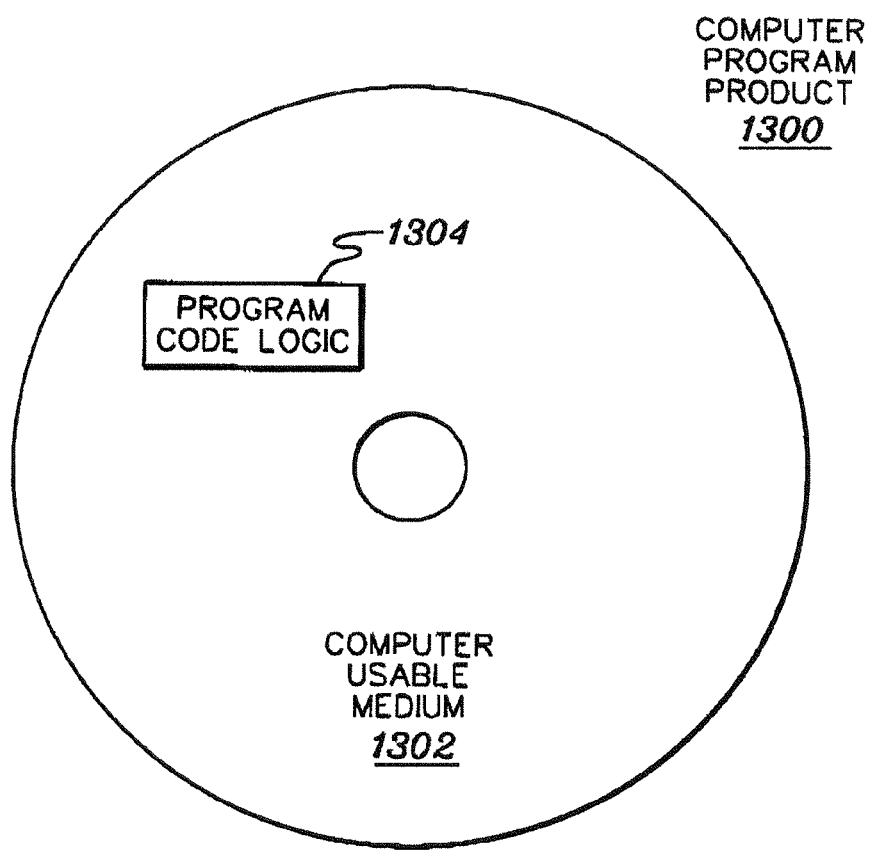
FIG. 13 depicts one embodiment of a computer program product incorporating one or more aspects of the present invention.

One example of an article of manufacture or a computer program product incorporating one or more aspects of the present invention is described with reference to FIG. 13. A computer program product 1300 includes, for instance, one or more computer usable media 1302 to store computer readable program code means or logic 1304 thereon to provide and facilitate one or more aspects of the present invention. The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

A sequence of program instructions or a logical assembly of one or more interrelated modules defined by one or more computer readable program code means or logic direct the performance of one or more aspects of the present invention.

Advantageously, a capability is provided for conditionally controlling when a resource of an IT environment is to take a particular action, such as its own recovery. The delegation of such an action is based on, for instance, whether the resource can be delegated to and whether it is being shared at a selected point in time during runtime (e.g., when the RS associated with the resource is activated for monitoring or deactivated for monitoring, or when a resource is added or removed from a RS associated with the resource (or at other times, in other embodiments). This ensures that one resource does not unexpectedly affect another resource. Advantageously, this capability is dynamic allowing decisions by the delegated to resource to be made at runtime, and more specifically, at the time recovery is needed. Additionally, the decisions are dynamically determined as resources change in their use and support of one or more business applications.

Although various embodiments are described above, these are only examples. For example, the processing environments described herein are only examples of environments that may incorporate and use one or more aspects of the present invention. Environments may include other types of processing units or servers or the components in each processing environment may be different than described herein. Each processing environment may include additional, less and/or different components than described herein. Further, the types of central processing units and/or operating systems or other types of components may be different than described herein. Again, these are only provided as examples.

Moreover, an environment may include an emulator (e.g., software or other emulation mechanisms), in which a particular architecture or subset thereof is emulated. In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to obtain instructions from memory and to optionally, provide local buffering for the obtained instruction; an instruction decode unit to receive the instruction fetched and to determine the type of instructions that have been fetched; and an instruction execution unit to execute the instructions. Execution may include loading data into a register for memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

Further, although the environments described herein are related to the management of availability of a customer's environment, one or more aspects of the present invention may be used to manage aspects other than or in addition to availability. Further, one or more aspects of the present invention can be used in environments other than a business resiliency environment.

Yet further, many examples are provided herein, and these examples may be revised without departing from the spirit of the present invention. For example, in one embodiment, the description is described in terms of availability and recovery; however, other goals and/or objectives may be specified in lieu of or in addition thereto. Additionally, the resources may be other than IT resources. Further, there may be references to particular products offered by International Business Machines Corporation or other companies. These again are only offered as examples, and other products may also be used. Additionally, although tables and databases are described herein, any suitable data structure may be used. There are many other variations that can be included in the description described herein and all of these variations are considered a part of the claimed invention.

Further, for completeness in describing one example of an environment in which one or more aspects of the present invention may be utilized, certain components and/or information is described that is not needed for one or more aspects of the present invention. These are not meant to limit the aspects of the present invention in any way.

One or more aspects of the present invention can be provided, offered, deployed, managed, serviced, etc. by a service provider who offers management of customer environments. For instance, the service provider can create, maintain, support, etc. computer code and/or a computer infrastructure that performs one or more aspects of the present invention for one or more customers. In return, the service provider can receive payment from the customer under a subscription and/or fee agreement, as examples. Additionally or alternatively, the service provider can receive payment from the sale of advertising content to one or more third parties.

In one aspect of the present invention, an application can be deployed for performing one or more aspects of the present invention. As one example, the deploying of an application comprises providing computer infrastructure operable to perform one or more aspects of the present invention.

As a further aspect of the present invention, a computing infrastructure can be deployed comprising integrating computer readable code into a computing system, in which the code in combination with the computing system is capable of performing one or more aspects of the present invention.

As yet a further aspect of the present invention, a process for integrating computing infrastructure, comprising integrating computer readable code into a computer system may be provided. The computer system comprises a computer usable medium, in which the computer usable medium comprises one or more aspects of the present invention. The code in combination with the computer system is capable of performing one or more aspects of the present invention.

The capabilities of one or more aspects of the present invention can be implemented in software, firmware, hardware, or some combination thereof. At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

Although embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A computer-implemented method of controlling performance of actions within an Information Technology (IT) environment, said computer-implemented method comprising:
   determining, by a processor during runtime of the IT environment, whether a given component of the IT environment is being shared at a selected point in time during runtime by a plurality of business applications of the IT environment, wherein the given component is being shared at the selected point in time responsive to the given component being included at the selected point in time in a plurality of recovery segments representing the plurality of business applications; and
   directing the given component to take action itself based on the determining, wherein the action to be taken is dependent on whether the given component is being shared at the selected point in time by the plurality of business applications.

2. The computer-implemented method of claim 1, wherein the action comprises performing by the component its own recovery, in response to the determining indicating that the component is not being shared at the selected point in time.

3. The computer-implemented method of claim 2, wherein the recovery is to be performed within a predefined amount of time to ensure a goal associated with the component is met.

4. The computer-implemented method of claim 3, further comprising indicating to the component the predefined amount of time.

5. The computer-implemented method of claim 3, wherein the goal comprises a recovery time objective.

6. The computer-implemented method of claim 5, wherein the component comprises a resource and the recovery time objective is a portion of a total recovery time objective specified for a set of related resources of which the resource is a part.

7. The computer-implemented method of claim 1, wherein the action comprises disabling recovery operations by the component, wherein the component is prohibited from performing its own recovery in response to the determining indicating the component is being shared at the selected point in time.

8. The computer-implemented method of claim 1, further comprising deciding whether the component can be delegated to, and wherein the action comprises performing by the component its own recovery, in response to the determining indicating that the component is not being shared at the selected point in time and the deciding indicating that the component can be delegated to.

9. The computer-implemented method of claim 1, wherein the determining is performed, in response to an indication that an action can be delegated to the component.

10. The computer-implemented method of claim 1, wherein the sharing ability of the component changes dynamically during runtime of the IT environment.

11. The computer-implemented method of claim 10, wherein the component comprises a resource of a first resource set and is not being shared, and wherein the computer-implemented method further comprises adding the resource to another resource set, wherein the resource is now shared by multiple business applications.

12. The computer-implemented method of claim 10, wherein the component comprises a resource, said resource being included in multiple resource sets and therefore shared by multiple applications, and wherein the computer-implemented method further comprises removing the resource from the multiple resource sets except for one resource set such that the resource is no longer shared by multiple business applications.

13. The computer-implemented method of claim 1, wherein the selected point in time comprises at least one of a Recovery Segment associated with the component being activated for monitoring, a Recovery Segment associated with the component being deactivated for monitoring, a resource being added to a Recovery Segment associated with the component, or a resource being removed from a Recovery Segment associated with the component.

14. The method of claim 1, wherein the action to be taken is dependent on the criticality of one or more business applications of the IT environment impacted by the action to be taken.

15. The method of claim 14, wherein the one or more business applications comprises at least two business applications, wherein one business application of the at least two business applications is of a greater criticality than another business application of the at least two business applications, and wherein the action to be taken is dependent on the impact to the one business application as compared to the impact to the another business application.

16. A system of controlling performance of actions within an Information Technology (IT) environment, said system comprising:

at least one processor to determine, during runtime of the IT environment, whether a given component of the IT environment is being shared at a selected point in time during runtime by a plurality of business applications of the IT environment, wherein the given component is being shared at the selected point in time responsive to the given component being included at the selected point in time in a plurality of recovery segments representing the plurality of business applications; and at least one processor to direct the given component to take action itself based on the determining, wherein the action to be taken is dependent on whether the given component is being shared at the selected point in time by the plurality of business applications.

17. The system of claim 16, wherein the action comprises performing by the component its own recovery, in response to the determining indicating that the component is not being shared at the selected point in time.

18. The system of claim 16, wherein the action comprises disabling recovery operations by the component, wherein the component is prohibited from performing its own recovery in response to the determining indicating the component is being shared at the selected point in time.

19. A computer program product for controlling performance of actions within an Information Technology (IT) environment, the computer program product including:

a non-transitory computer readable storage medium readable by a processor and storing instructions for execution by the processor for performing a method comprising:

determining, during runtime of the IT environment, whether a given component of the IT environment is being shared at a selected point in time during runtime by a plurality of business applications of the IT environment, wherein the given component is being shared at the selected point in time responsive to the given component being included at the selected point in time in a plurality of recovery segments representing the plurality of business applications; and directing the given component to take action itself based on the determining, wherein the action to be taken is dependent on whether the given component is being shared at the selected point in time by the plurality of business applications.

20. The computer program product of claim 19, wherein the action comprises performing by the component its own recovery, in response to the determining indicating that the component is not being shared at the selected point in time.

21. The computer program product of claim 19, wherein the action comprises disabling recovery operations by the component, wherein the component is prohibited from performing its own recovery in response to the determining indicating the component is being shared at the selected point in time.

22. The computer program product of claim 19, wherein the determining is performed, in response to an indication that an action can be delegated to the component.

* * * * *